(12) United States Patent
Han

(10) Patent No.: US 12,344,320 B2
(45) Date of Patent: Jul. 1, 2025

(54) UNITARY STRUCTURAL COMPONENT AND VEHICLE FLOOR SYSTEM HAVING THE SAME

(71) Applicants: HYUNDAI MOTOR COMPANY, Seoul (KR); Kia Corporation, Seoul (KR)

(72) Inventor: Seung Woo Han, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 369 days.

(21) Appl. No.: 17/975,275

(22) Filed: Oct. 27, 2022

(65) Prior Publication Data

US 2024/0001997 A1    Jan. 4, 2024

(30) Foreign Application Priority Data

Jun. 30, 2022 (KR) .......... 10-2022-0080653

(51) Int. Cl.
*B62D 25/20* (2006.01)
(52) U.S. Cl.
CPC ............... *B62D 25/2009* (2013.01)
(58) Field of Classification Search
None
See application file for complete search history.

(56) References Cited

U.S. PATENT DOCUMENTS

| | | | |
|---|---|---|---|
| 4,898,419 A * | 2/1990 | Kenmochi | B62D 25/2036 428/116 |
| 4,907,735 A * | 3/1990 | Ushioda | B62D 21/00 280/798 |
| 5,496,067 A * | 3/1996 | Stoll | B62D 21/07 280/783 |
| 6,523,876 B1 * | 2/2003 | Durand | B62D 21/02 296/35.3 |
| 8,985,680 B2 * | 3/2015 | Mildner | B62D 25/20 296/193.07 |
| 9,108,682 B2 * | 8/2015 | Mori | B62D 25/2036 |
| 9,580,105 B2 | 2/2017 | Oh et al. | |
| 9,688,315 B2 * | 6/2017 | Peschansky | B62D 25/2009 |
| 10,160,407 B2 | 12/2018 | Murasawa et al. | |

(Continued)

FOREIGN PATENT DOCUMENTS

| | | | |
|---|---|---|---|
| JP | 04300792 A | * | 10/1992 |
| KR | 10-2023-0145804 A | | 10/2023 |

OTHER PUBLICATIONS

Office Action dated Aug. 15, 2024, issued in related U.S. Appl. No. 17/901,345.

*Primary Examiner* — Amy R Weisberg
*Assistant Examiner* — Veronica M Condo
(74) *Attorney, Agent, or Firm* — MORGAN, LEWIS & BOCKIUS LLP

(57) ABSTRACT

Provided is a unitary structural component, including: a front cross portion; a rear cross portion spaced apart from the front cross portion; a central extension portion connecting the front cross portion and the rear cross portion; and a pair of edge extension portions connecting both ends of the front cross portion and both ends of the rear cross portion, respectively. The front cross portion, the rear cross portion, the central extension portion, and the pair of edge extension portions form a unitary one-piece structure.

17 Claims, 18 Drawing Sheets

(56) References Cited

U.S. PATENT DOCUMENTS

| | | | |
|---|---|---|---|
| 11,148,721 B2 * | 10/2021 | Liu | B62D 21/08 |
| 11,420,686 B2 | 8/2022 | Matsuda et al. | |
| 2010/0133878 A1 * | 6/2010 | Teli | B62D 27/026 |
| | | | 296/193.07 |
| 2010/0259071 A1 * | 10/2010 | Enns | B62D 25/06 |
| | | | 296/203.01 |
| 2023/0322307 A1 | 10/2023 | Park | |

* cited by examiner

UNITARY STRUCTURAL COMPONENT AND VEHICLE FLOOR SYSTEM HAVING THE SAME

CROSS-REFERENCE TO RELATED APPLICATION

This application is based on and claims the benefit of priority to Korean Patent Application No. 10-2022-0080653, filed on Jun. 30, 2022, in the Korean Intellectual Property Office, the disclosure of which is incorporated herein in its entirety by reference.

TECHNICAL FIELD

The present disclosure relates to a unitary structural component and a vehicle floor system having the same, and more particularly, to a unitary structural component designed to allow a front cross portion, a rear cross portion, a central extension portion, and edge extension portions to form a unitary one-piece structure, and a vehicle floor system having the same.

BACKGROUND

A vehicle includes a floor made of a steel material, and a plurality of associated components may be attached to the floor using fasteners, welding, and/or the like. The plurality of associated components may increase strength and stiffness of the floor, and allow interior components such as vehicle seats to be mounted on a vehicle body. For example, the plurality of associated components includes a plurality of cross members, a plurality of longitudinal members, and a plurality of brackets.

As the plurality of associated components are assembled to the floor using fasteners, welding, and/or the like, it may be difficult to simplify the assembly process, the layout of interior components, and interior styling.

According to the related art, as the plurality of cross members, the plurality of longitudinal members, and the plurality of brackets are individually joined to the floor, the number of assembled components and joint portions and the overall weight thereof may increase, and the assembly process thereof may be complex.

In addition, according to the related art, the cost of quality management for controlling gap/height differences between the floor and the associated components may be excessive. Due to variation in manufacturing tolerance, it may be difficult to secure the gaps between the floor and the associated components, so there is a high possibility of noise, buzz, squeak and rattle (BSR), and the like.

The above information described in this background section is provided to assist in understanding the background of the inventive concept, and may include any technical concept which is not considered as the prior art that is already known to those skilled in the art.

SUMMARY

The present disclosure has been made to solve the above-mentioned problems occurring in the prior art while advantages achieved by the prior art are maintained intact.

An aspect of the present disclosure provides a unitary structural component designed to allow a front cross portion, a rear cross portion, a central extension portion, and edge extension portions to form a unitary one-piece structure, thereby improving stiffness, strength, and crashworthiness of a vehicle and being suited to a floor system of good exterior styling, and a vehicle floor system having the same.

According to an aspect of the present disclosure, a unitary structural component may include: a front cross portion; a rear cross portion spaced apart from the front cross portion; a central extension portion connecting the front cross portion and the rear cross portion; and a pair of edge extension portions connecting both ends of the front cross portion and both ends of the rear cross portion, respectively. The front cross portion, the rear cross portion, the central extension portion, and the pair of edge extension portions may form a unitary one-piece structure. As the front cross portion, the rear cross portion, the central extension portion, and the pair of edge extension portions, which are attached to the floor, form a unitary one-piece structure, stiffness, strength, and crashworthiness of a vehicle body may be improved, and a floor system of good exterior styling may be provided.

The front cross portion may include a pair of front enlarged portions connected to the opposing ends thereof, respectively, and a cross-sectional area of each front enlarged portion may gradually increase from a corresponding end of the front cross portion toward the exterior of the vehicle. In the event of a side collision/impact of the vehicle, the front cross portion may stably transfer and distribute an impact load through the front enlarged portions provided on the opposing ends thereof.

Each front enlarged portion may have a pair of opposing tapered walls, and the pair of tapered walls may be inclined in opposite directions with respect to a longitudinal axis of the front cross portion. Accordingly, the front enlarged portion may stably serve as a load path of the impact load through the tapered walls which are inclined in the opposite directions.

The rear cross portion may include a pair of rear enlarged portions connected to the opposing ends thereof, respectively, and a cross-sectional area of each rear enlarged portion may gradually increase from a corresponding end of the rear cross portion toward the exterior of the vehicle. In the event of a side collision/impact of the vehicle, the rear cross portion may stably transfer and distribute an impact load through the rear enlarged portions provided on the opposing ends thereof.

Each rear enlarged portion may have a pair of opposing tapered walls, and the pair of tapered walls may be inclined in opposite directions with respect to a longitudinal axis of the rear cross portion. Accordingly, the rear enlarged portion may stably serve as a load path of the impact load through the tapered walls which are inclined in the opposite directions.

A longitudinal axis of the central extension portion may be perpendicular to a longitudinal axis of the front cross portion and a longitudinal axis of the rear cross portion. As the longitudinal axis of the central extension portion is perpendicular to each longitudinal axis of the front cross portion and the rear cross portion, it may stably define a load path between the front cross portion and the rear cross portion. The central extension portion may connect the front cross portion and the rear cross portion in a longitudinal direction of the vehicle and a longitudinal direction of the floor, thereby improving vehicle body stiffness and noise, vibration and harshness (NVH) performance.

The unitary structural component may further include a pair of side extension portions located symmetrically with respect to the central extension portion, and a longitudinal axis of each side extension portion may be parallel to a longitudinal axis of the central extension portion. As the pair of side extension portions are located symmetrically with respect to the central extension portion, they may stably define load paths between the front cross portion and the rear cross portion. The pair of side extension portions may connect the front cross portion and the rear cross portion in the longitudinal direction of the vehicle and the longitudinal direction of the floor, thereby improving vehicle body stiffness and NVH performance.

A height of the side extension portion may be less than that of the front cross portion. Accordingly, when vehicle seats are mounted on the front cross portion and the rear cross portion, they may be prevented from being interfered by the side extension portions, and a flat floor system may be effectively implemented.

The front cross portion, the rear cross portion, the central extension portion, the pair of edge extension portions, and the pair of side extension portions may be made of the same material and have the same thickness. Accordingly, the front cross portion, the rear cross portion, the central extension portion, the pair of edge extension portions, and the pair of side extension portions may be precisely and easily formed by hot stamping, hot forming, press hardening, and/or the like.

The front cross portion may have a pair of front enlarged portions connected to the opposing ends thereof, respectively, the rear cross portion may have a pair of rear enlarged portions connected to the opposing ends thereof, respectively, and each edge extension portion may extend from a corresponding front enlarged portion to a corresponding rear enlarged portion. Accordingly, each edge extension portion may connect the corresponding front enlarged portion of the front cross portion and the corresponding rear enlarged portion of the rear cross portion in the longitudinal direction of the vehicle so that the unitary structural component may be firmly joined to the floor and a side sill inner.

According to an aspect of the present disclosure, a vehicle floor system may include: a floor having a pair of opposing flanges; a pair of side sill inners joined to the pair of opposing flanges, respectively; and a unitary structural component joined to the floor. The unitary structural component may include: a front cross portion; a rear cross portion spaced apart from the front cross portion; a central extension portion connecting the front cross portion and the rear cross portion; and a pair of edge extension portions connecting both ends of the front cross portion and both ends of the rear cross portion, respectively. The front cross portion, the rear cross portion, the central extension portion, and the pair of edge extension portions may form a unitary one-piece structure.

The unitary structural component may further include a pair of side extension portions located symmetrically with respect to the central extension portion. A longitudinal axis of the central extension portion may be perpendicular to each longitudinal axis of the front cross portion and the rear cross portion, and the longitudinal axis of the central extension portion may be parallel to a longitudinal axis of the pair of side extension portions.

The front cross portion may have a flange facing the rear cross portion, and the rear cross portion may have a flange facing the front cross portion. The central extension portion may have a flange connecting the flange of the front cross portion and the flange of the rear cross portion, and each side extension portion may have a flange connecting the flange of the front cross portion and the flange of the rear cross portion. The flange of the front cross portion, the flange of the rear cross portion, the flange of the central extension portion, and the flange of the side extension portion may be connected to form a closed loop shape. The flange of the front cross portion, the flange of the rear cross portion, the flange of the central extension portion, and the flange of the side extension portion may be joined to the floor. Accordingly, a flange structure having the closed loop shape may be provided between the front cross portion, the rear cross portion, the central extension portion, and the side extension portion so that the unitary structural component may be firmly joined to the floor.

The front cross portion may include a pair of front enlarged portions connected to the opposing ends thereof, respectively, and a cross-sectional area of each front enlarged portion may gradually increase from a corresponding end of the front cross portion toward the exterior of the vehicle.

The front enlarged portion may include a joint wall joined to a corresponding side sill inner, and the front enlarged portion, the side sill inner, and the floor may define an interior cavity. A reinforcing member may be disposed in the interior cavity. As the reinforcing memter is disposed in the interior cavity defined by the front enlarged portion, the side sill inner, and the floor, the reinforcing memter may be prevented from being exposed to the outside, and accordingly a floor system of good exterior styling may be provided. The reinforcing memter may improve stiffness of the front enlarged portion. Accordingly, in the event of a side collision/impact of the vehicle, the bending, rotation, and/or the like of the side sill inner may be prevented, and crashworthiness may be improved.

The rear cross portion may include a pair of rear enlarged portions connected to the opposing ends thereof, respectively, and a cross-sectional area of each rear enlarged portion may gradually increase from a corresponding end of the rear cross portion toward the exterior of the vehicle.

The rear enlarged portion may include a joint wall joined to a corresponding side sill inner, and the rear enlarged portion, the side sill inner, and the floor may define an interior cavity. A reinforcing member may be disposed in the interior cavity. As the reinforcing member is disposed in the interior cavity defined by the rear enlarged portion, the side sill inner, and the floor, the reinforcing member may be prevented from being exposed to the outside, and accordingly a floor system of good exterior styling may be provided. The reinforcing member may improve stiffness of the rear enlarged portion. Accordingly, in the event of a side collision/impact of the vehicle, the bending, rotation, and/or the like of the side sill inner may be prevented, and crashworthiness may be improved.

The front enlarged portion may have a flange facing the rear enlarged portion, and the rear enlarged portion may have a flange facing the front enlarged portion. Each side extension portion may have a flange facing a corresponding edge extension portion, and each edge extension portion may have a flange facing a corresponding side extension portion. The flange of the front cross portion, the flange of the rear cross portion, the flange of the front enlarged portion, the flange of the rear enlarged portion, the flange of the side extension portion, and the flange of the edge extension portion may be connected to form a closed loop shape. The flange of the front cross portion, the flange of the rear cross portion, the flange of the front enlarged portion, the flange of the rear enlarged portion, the flange of the side extension portion, and the flange of the edge extension portion may be joined to the floor. Accordingly, a flange structure having the closed loop shape may be provided between the front cross portion, the rear cross portion, the side extension portion, and the edge extension portion so that the unitary structural component may be firmly joined to the floor.

Each edge extension portion may be at least partially overlapped and joined to a corresponding side sill inner and a corresponding flange of the floor. As the edge extension portion, the flange of the floor, and the side sill inner are triple-overlapped and joined, joint stiffness between the unitary structural component, the floor, and the side sill inner may be improved.

Each flange of the floor may be joined to an inboard side wall of a corresponding side sill inner. As the flange of the floor is joined to the inboard side wall of the corresponding side sill inner, the rotation, deformation, and/or the like of the side sill inner may be prevented in the event of a side collision/impact of the vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
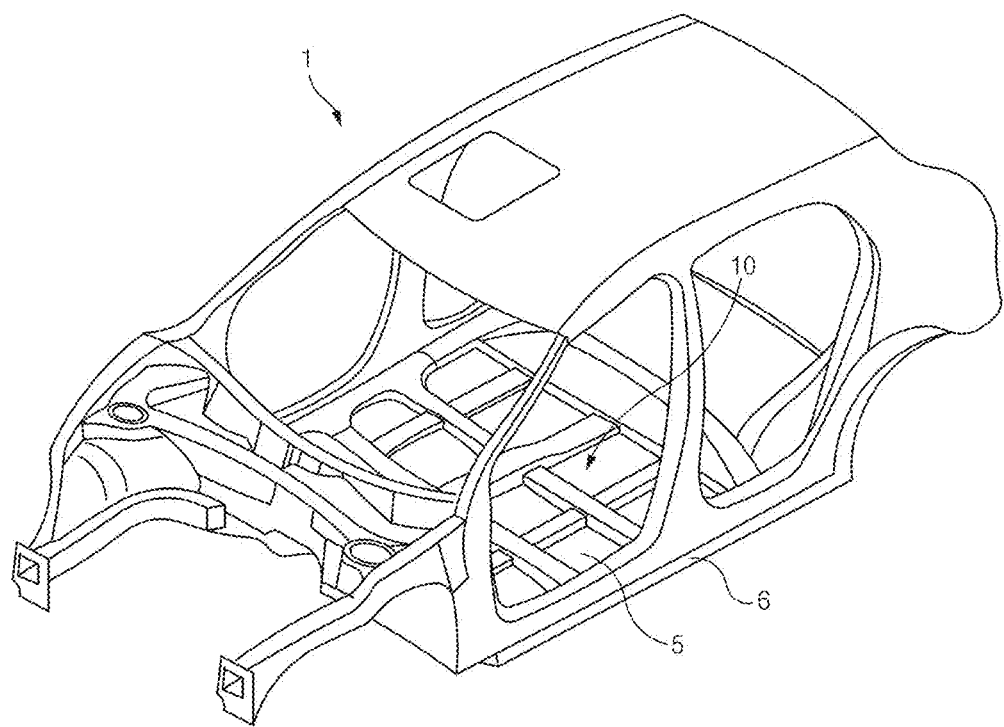
FIG. 1 illustrates a vehicle to which a unitary structural component according to an exemplary embodiment of the present disclosure is applied.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
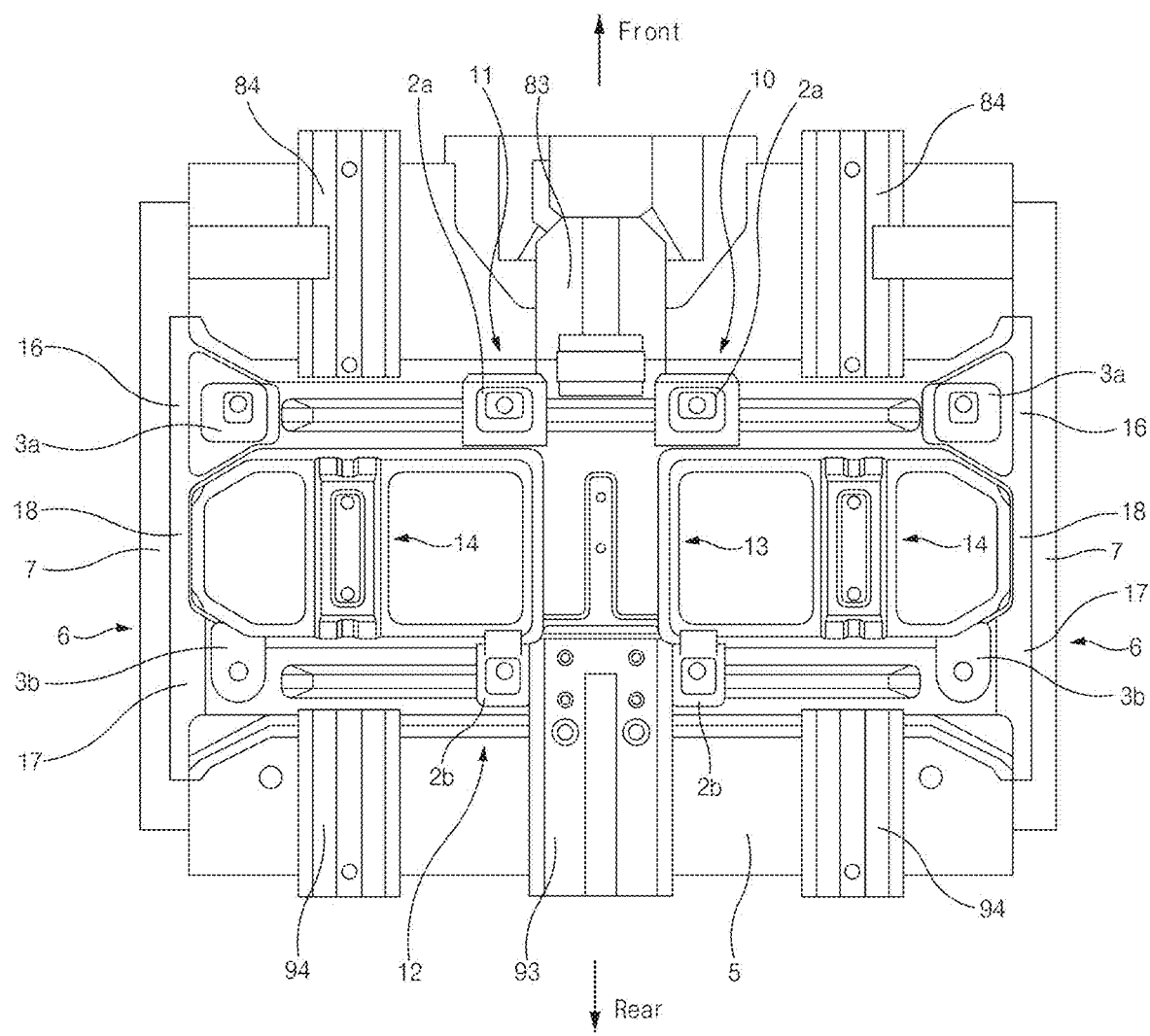
FIG. 2 illustrates a plan view of a vehicle floor system according to an exemplary embodiment of the present disclosure.

Referring to FIGS. 1 and 2, a unitary structural component according to an exemplary embodiment of the present disclosure may be fixed to a floor 5 using fasteners, welding, and/or the like. The floor 5 may have a front edge facing the front of the vehicle, and a rear edge facing the rear of the vehicle. A pair of side sills 6 may be connected to both side edges of the floor using fasteners, welding, and/or the like, respectively. The floor 5 may be a central floor panel connected to a front structure of the vehicle.

Figure 14:
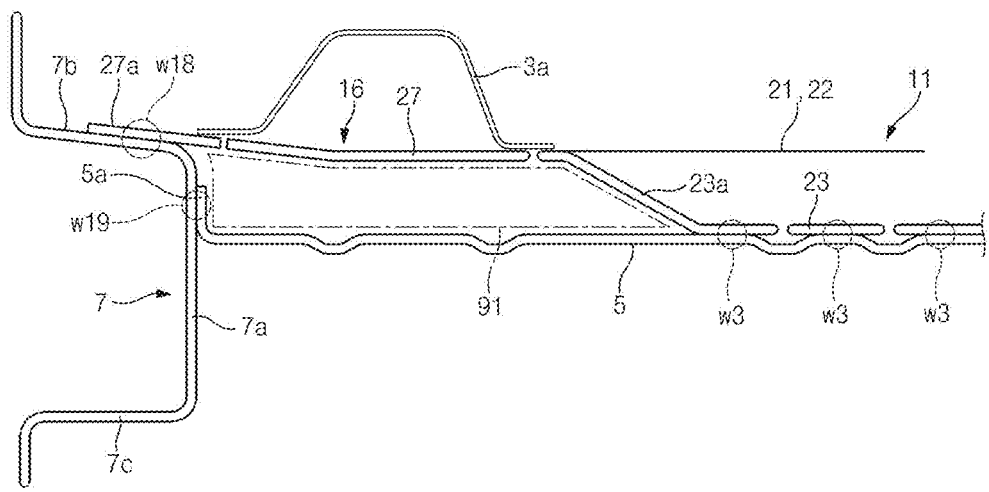
FIG. 14 illustrates a cross-sectional view, taken along line J-J of FIG. 13.
Figure 15:
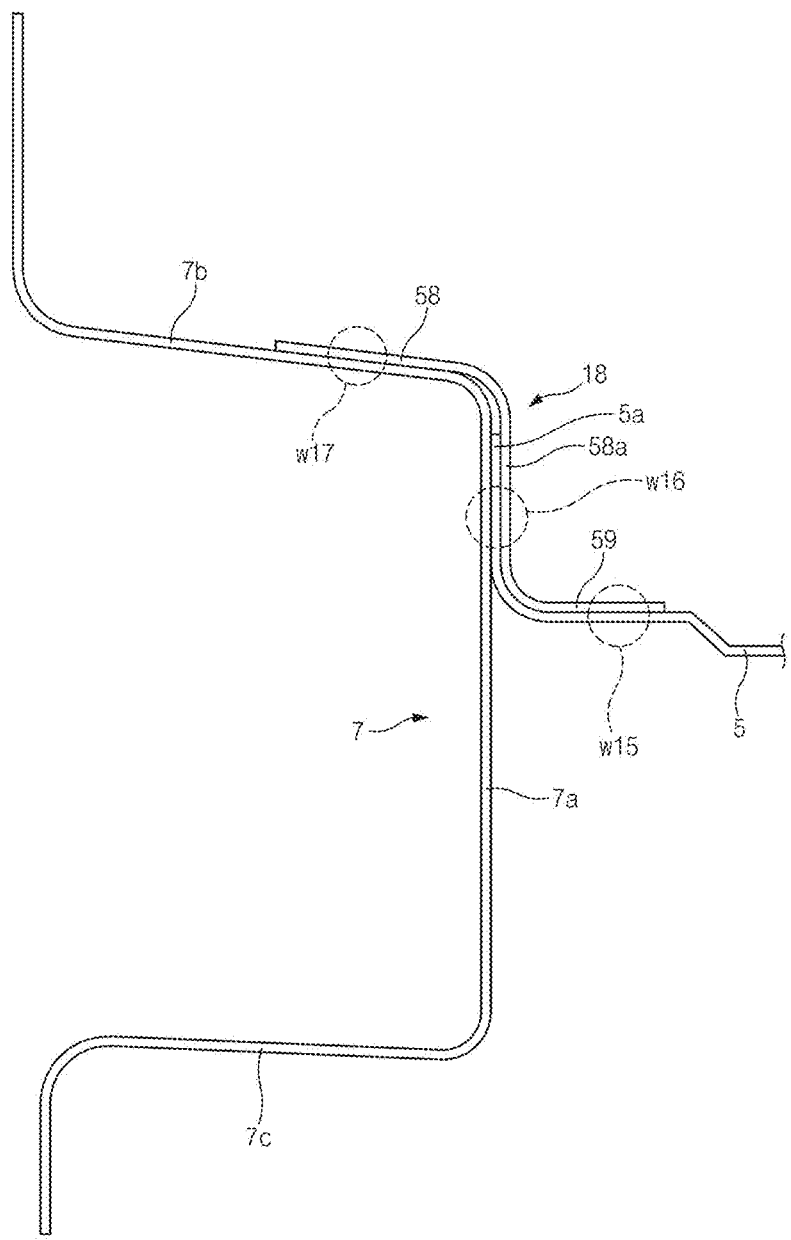
FIG. 15 illustrates a cross-sectional view, taken along line K-K of FIG. 13.
Figure 16:
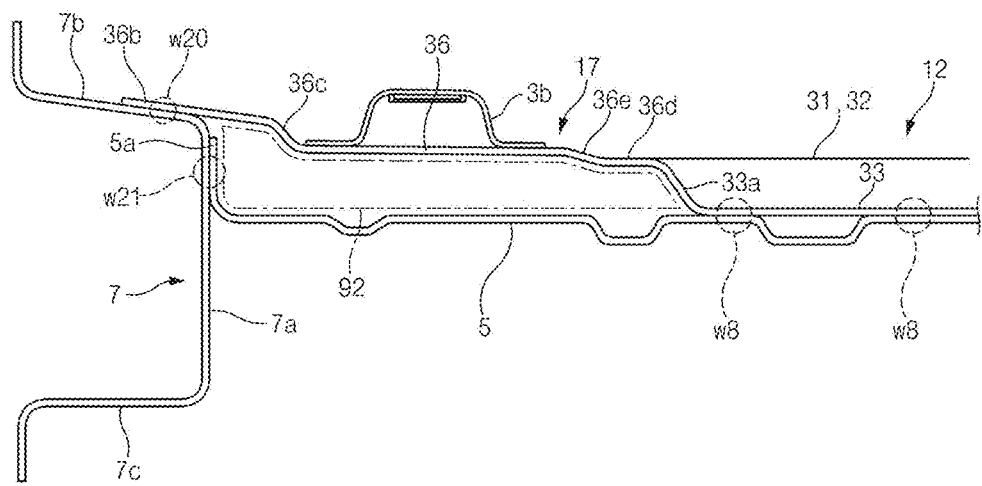
FIG. 16 illustrates a cross-sectional view, taken along line L-L of FIG. 13.

Referring to FIGS. 14 to 16, the floor 5 may have a pair of opposing flanges 5a, and the pair of flanges 5a may be provided on the opposing side edges of the floor 5, respectively. Each flange 5a may extend vertically from the corresponding edge of the floor 5. Each side sill 6 may include a side sill inner 7 and a side sill outer (not shown) joined to the side sill inner 7. The side sill inner 7 may include an inboard side wall 7a facing a passenger compartment, a top wall 7b extending horizontally from a top edge of the inboard side wall 7a, and a bottom wall 7c extending horizontally from a bottom edge of the inboard side wall 7a. The inboard side wall 7a of the side sill inner 7 may extend vertically. That is, the flange 5a of the floor 5 may have a shape matching that of the inboard side wall 7a of the side sill inner 7, and the flange 5a of the floor 5 may be joined to the inboard side wall 7a of the side sill inner 7.

Figure 3:
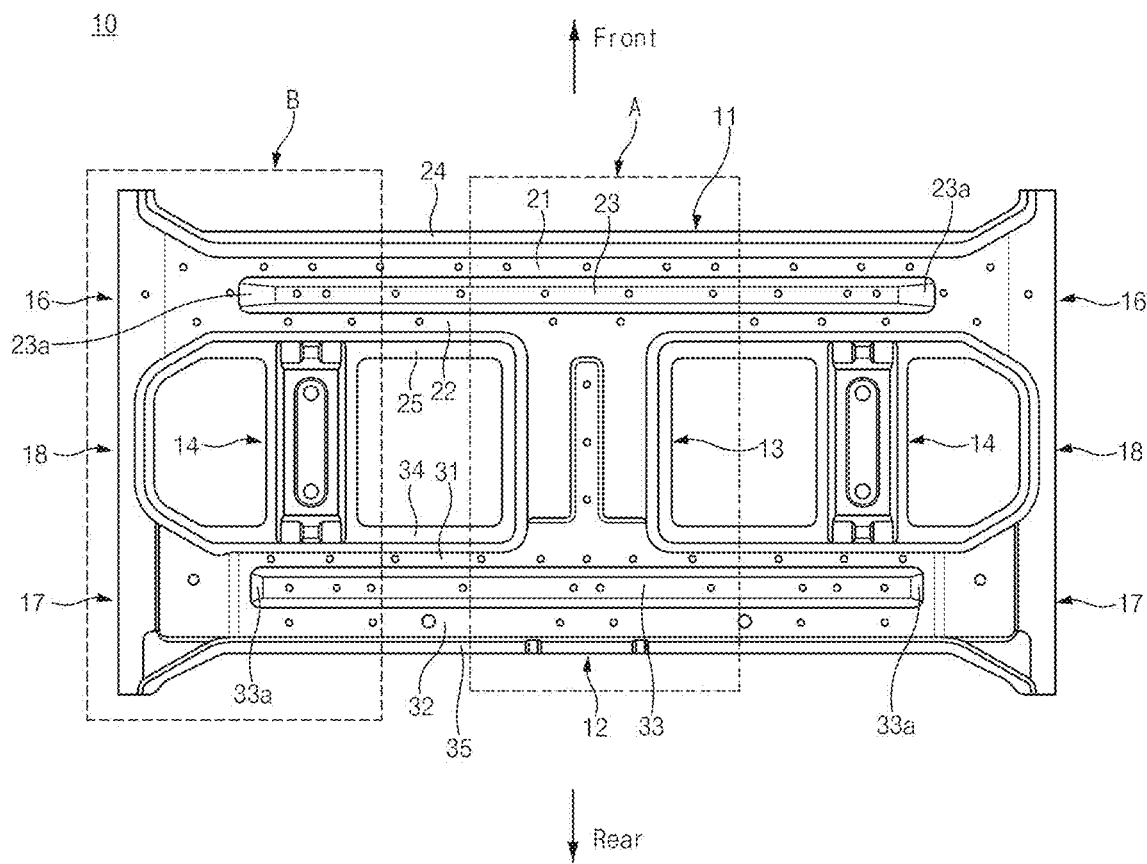
FIG. 3 illustrates a plan view of a unitary structural component according to an exemplary embodiment of the present disclosure.

Referring to FIG. 3, the unitary structural component 10 may include a front cross portion 11, a rear cross portion 12 located behind the front cross portion 11, a central extension portion 13 connecting the front cross portion 11 and the rear cross portion 12, and a pair of edge extension portions 18.

According to an exemplary embodiment, the front cross portion 11, the rear cross portion 12, the central extension portion 13, and the pair of edge extension portions 18 may form a unitary one-piece structure by hot stamping, hot foaming, press hardening, and/or the like. That is, the front cross portion 11, the rear cross portion 12, the central extension portion 13, and the pair of edge extension portions 18 may be made of the same material.

According to an exemplary embodiment, the unitary structural component 10 may be made of a steel material having a strength of 1.4 G to 1.8 G.

According to an exemplary embodiment, the unitary structural component 10 may be joined to the floor 5 and the side sill inner 7 by spot welding.

[Front Cross Portion]

Referring to FIG. 2, the front cross portion 11 may be closer to the front edge of the floor 5 than the rear cross portion 12. The front cross portion 11 may extend in a width direction of the vehicle, and the front cross portion 11 may correspond to a front cross member or front seat cross member of an existing vehicle used for mounting vehicle seats.

Figure 4:
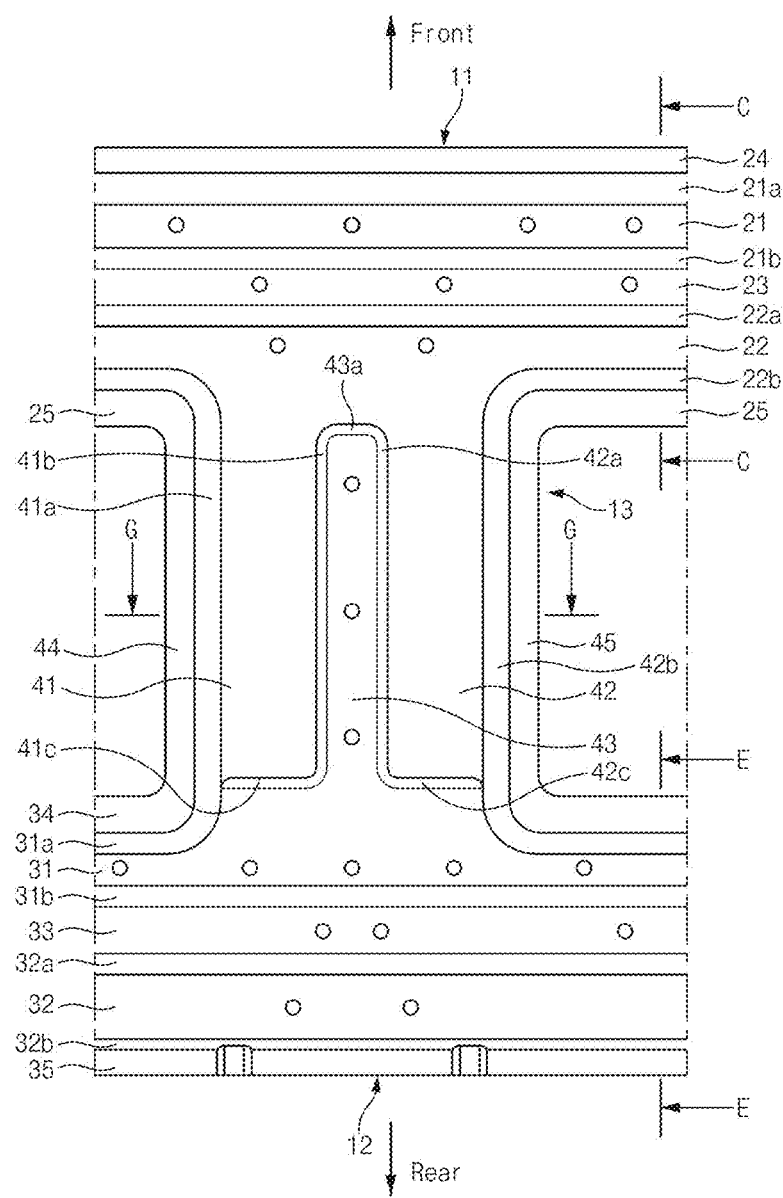
FIG. 4 illustrates an enlarged view of portion A of FIG. 3.
Figure 6:
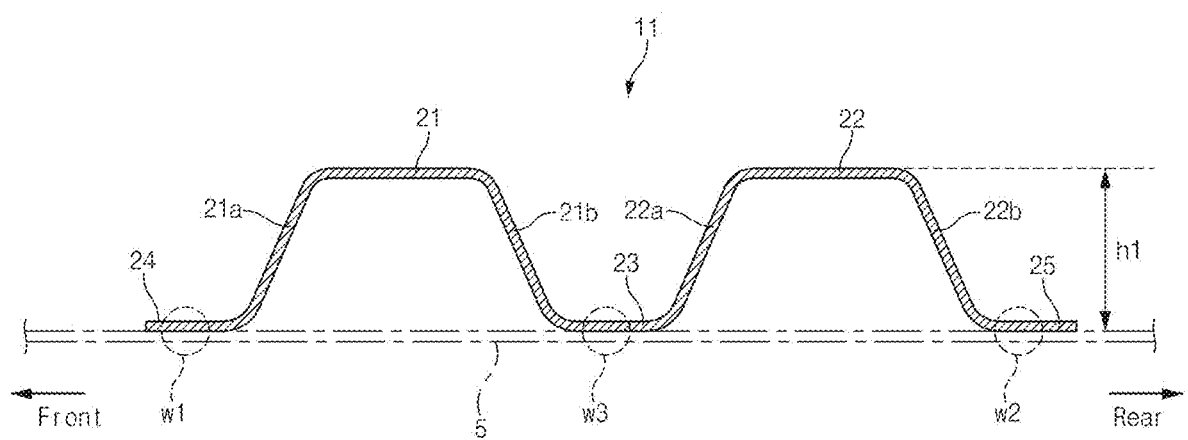
FIG. 6 illustrates a cross-sectional view, taken along line C-C of FIG. 4.

Referring to FIGS. 4 and 6, the front cross portion 11 may include a first top wall 21, a second top wall 22 spaced apart from the first top wall 21 toward the rear of the vehicle, a recessed wall 23 located between the first top wall 21 and the second top wall 22, a first flange 24 connected to the first top wall 21, and a second flange 25 connected to the second top wall 22. The first flange 24 may extend along a front edge of the front cross portion 11, and the second flange 25 may extend along a rear edge of the front cross portion 11.

Referring to FIG. 3, the first top wall 21, the second top wall 22, the recessed wall 23, the first flange 24, and the second flange 25 may extend along a longitudinal axis of the front cross portion 11. The first top wall 21, the second top wall 22, the recessed wall 23, the first flange 24, and the second flange may be parallel to each other.

Referring to FIG. 6, the first top wall 21 may extend horizontally, and a front edge of the first top wall 21 may be connected to a rear edge of the first flange 24 through a first front connection wall 21a. The first front connection wall 21a may extend obliquely from the first top wall 21 to the first flange 24. A rear edge of the first top wall 21 may be connected to a front edge of the recessed wall 23 through a first rear connection wall 21b. The first rear connection wall 21b may extend obliquely from the first top wall 21 to the recessed wall 23.

Referring to FIG. 6, the second top wall 22 may extend horizontally, and a front edge of the second top wall 22 may be connected to a rear edge of the recessed wall 23 through a second front connection wall 22a. The second front connection wall 22a may extend obliquely from the second top wall 22 to the recessed wall 23. A rear edge of the second top wall 22 may be connected to a front edge of the second flange 25 through a second rear connection wall 22b. The second rear connection wall 22b may extend obliquely from the second top wall 22 to the second flange 25.

Referring to FIG. 6, the recessed wall 23 may extend horizontally between a bottom end of the first rear connection wall 21b and a bottom end of the second front connection wall 22a 20 so that the recessed wall 23 may be recessed from the first top wall 21 and the second top wall 22 toward the floor 5. The first flange 24 may extend horizontally from a bottom end of the first front connection wall 21a so that the first flange 24 may be recessed from the first top wall 21 toward the floor 5, and the second flange 25 may extend horizontally from a bottom end of the second rear connection wall 22b so that the second flange 25 may be recessed from the second top wall 22 toward the floor 5. A depth of the recessed wall 23 may be the same as a depth of the first flange 24 and a depth of the second flange 25. The first flange 24, the second flange 25, and the recessed wall 23 may be jointed to the floor 5 using fasteners, welding, and/or the like.

According to an exemplary embodiment, the first flange 24, the second flange 25, and the recessed wall 23 of the front cross portion 11 may be joined to the floor 5 by spot welding.

Figure 17:
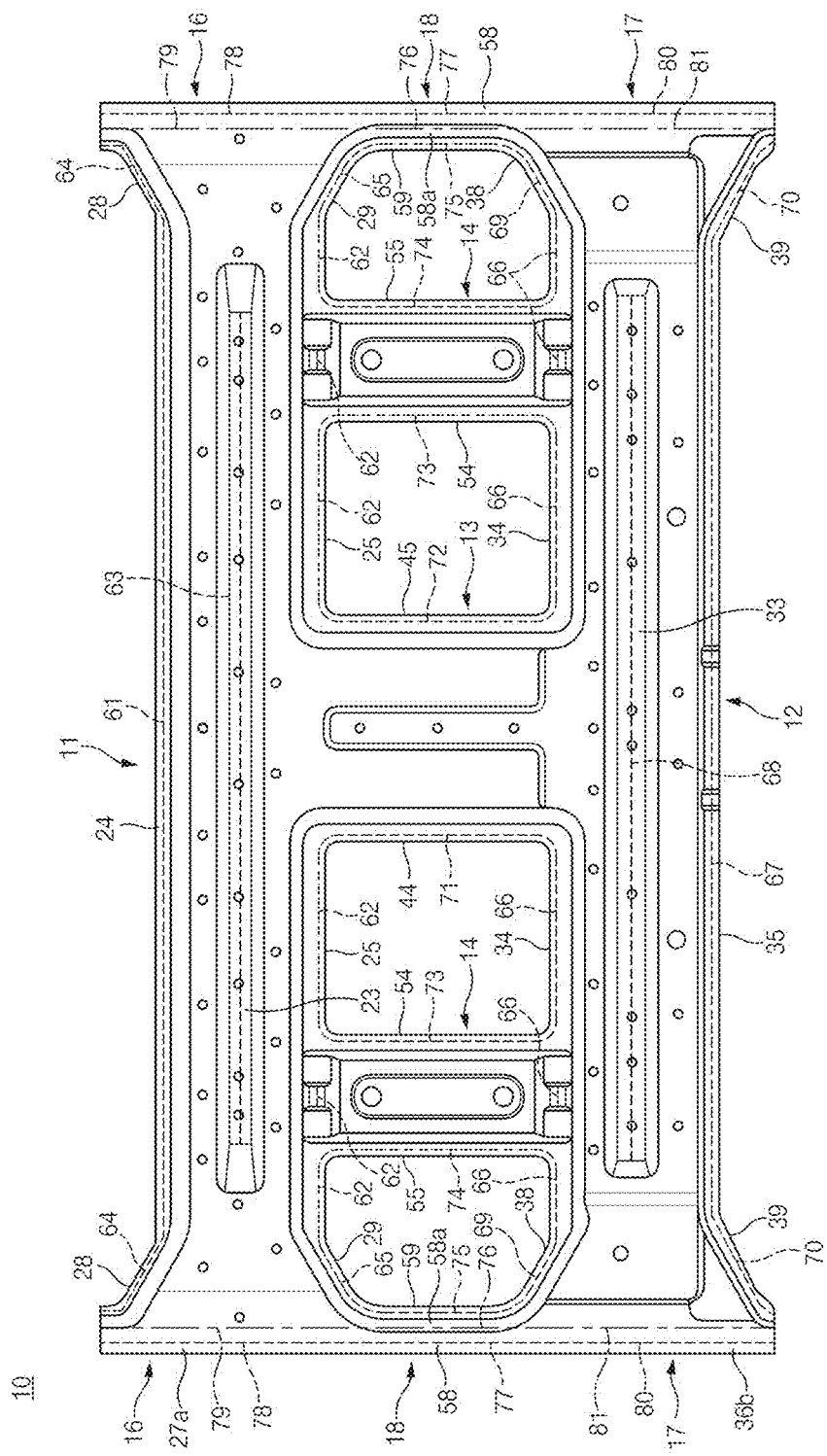
FIG. 17 illustrates a plan view of a plurality of joint lines on a vehicle floor system according to an exemplary embodiment of the present disclosure.

Referring to FIG. 6, the first flange 24 may be joined to the floor 5 through a first welding point w1. The plurality of first welding points w1 may be arranged to be spaced apart from each other at a predetermined pitch along the first flange 24 so that a first joint line 61 may extend along the first flange 24 of the front cross portion 11 as illustrated in FIG. 17.

Referring to FIG. 6, the second flange 25 may be joined to the floor 5 through a second welding point w2. The plurality of second welding points w2 may be arranged to be spaced apart from each other at a predetermined pitch along the second flange 25 so that a second joint line 62 may extend along the second flange 25 of the front cross portion 11 as illustrated in FIG. 17.

Referring to FIG. 6, the recessed wall 23 may be joined to the floor 5 through a third welding point w3. The plurality of third welding points w3 may be arranged to be spaced apart from each other at a predetermined pitch along the recessed wall 23 so that a third joint line 63 may extend along the recessed wall 23 as illustrated in FIG. 17.

Referring to FIG. 6, the front cross portion 11 may have an M-shaped cross section through the first top wall 21, the second top wall 22, the recessed wall 23, the first flange 24, and the second flange 25, and accordingly stiffness of the front cross portion 11 may be improved. The first top wall 21 and the second top wall 22 of the front cross portion 11 may have a first height h1.

[Front Enlarged Portion]

Referring to FIG. 3, the front cross portion 11 may have a pair of front enlarged portions 16 connected to the opposing ends thereof, respectively. Each front enlarged portion 16 may extend from the corresponding end of the front cross portion 11 toward the exterior of the vehicle. A central axis of the front enlarged portion 16 may be aligned with the longitudinal axis of the front cross portion 11.

Figure 5:
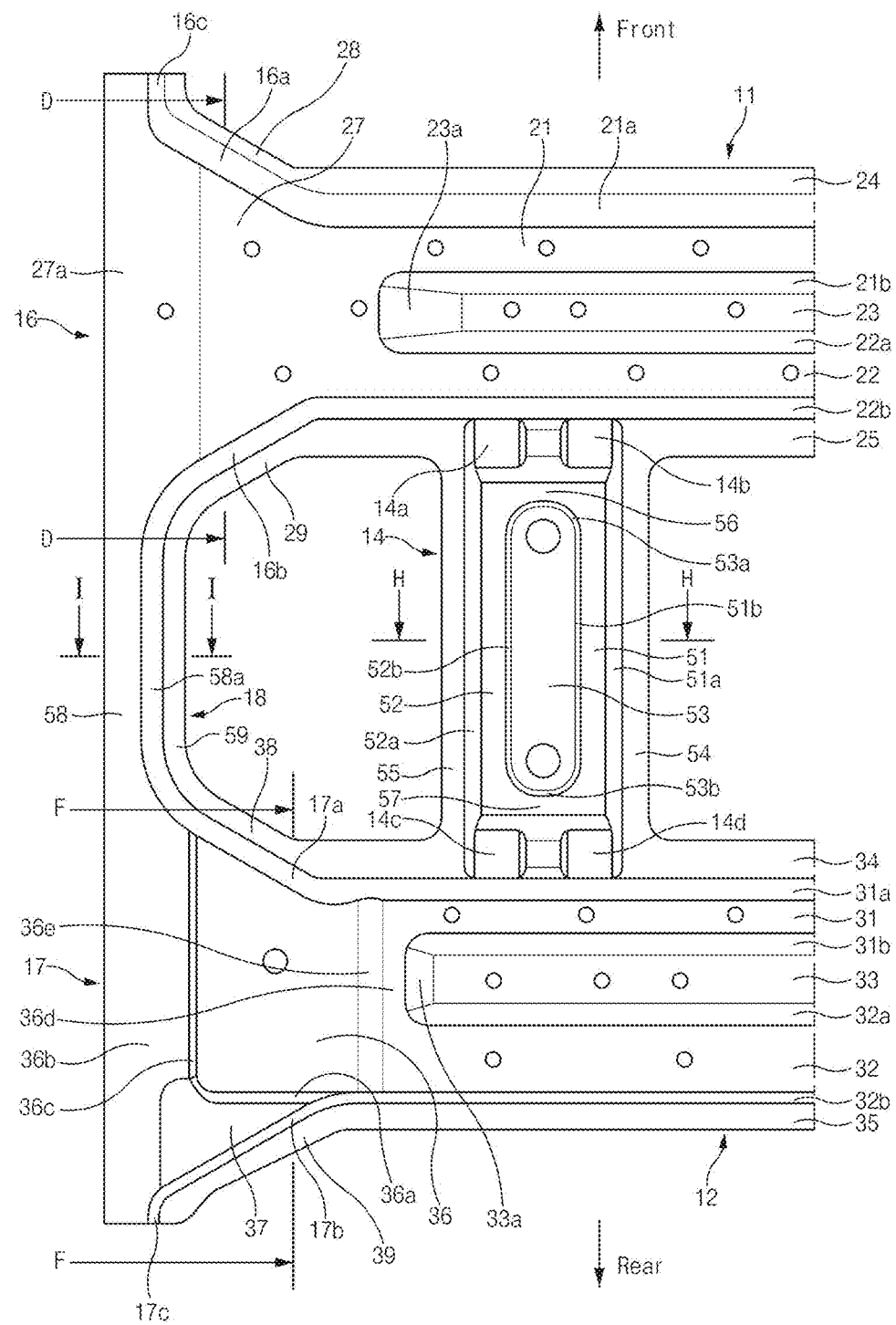
FIG. 5 illustrates an enlarged view of portion B of FIG. 3.

Referring to FIG. 5, each front enlarged portion 16 may have a pair of opposing tapered walls 16a and 16b. The pair of tapered walls 16a and 16b may include a first tapered wall 16a which is tapered toward the front of the vehicle, and a second tapered wall 16b which is tapered toward the rear of the vehicle. The first tapered wall 16a may extend from the first front connection wall 21a of the front cross portion 11 in a direction inclined with respect to the central axis of the front enlarged portion 16. The second tapered wall 16b may extend from the second rear connection wall 22b of the front cross portion 11 in a direction inclined with respect to the central axis of the front enlarged portion 16. That is, the first tapered wall 16a and the second tapered wall 16b may be inclined in opposite directions with respect to the central axis of the front enlarged portion 16 and the longitudinal axis of the front cross portion 11. Accordingly, a cross-sectional area of each front enlarged portion 16 may gradually increase from the corresponding end of the front cross portion 11 toward the exterior of the vehicle. In addition, a straight extension wall 16c may extend from the first tapered wall 16a toward the front of the vehicle, and the straight extension wall 16c may be joined to the side sill inner 7 of the side sill 6 using fasteners, welding, and/or the like.

Referring to FIG. 5, each front enlarged portion 16 may include a top wall 27 extending from the first top wall 21 and the second top wall 22 of the front cross portion 11, a first flange 28 connected to a front edge of the top wall 27, and a second flange 29 connected to a rear edge of the top wall 27.

The first flange 28 may extend along a front edge of the front enlarged portion 16, and the second flange 29 may extend along a rear edge of the front enlarged portion 16. Referring to FIG. 5, the first flange 28 may extend obliquely from the first flange 24 of the front cross portion 11, and the second flange 29 may extend obliquely from the second flange 25 of the front cross portion 11.

Figure 7:
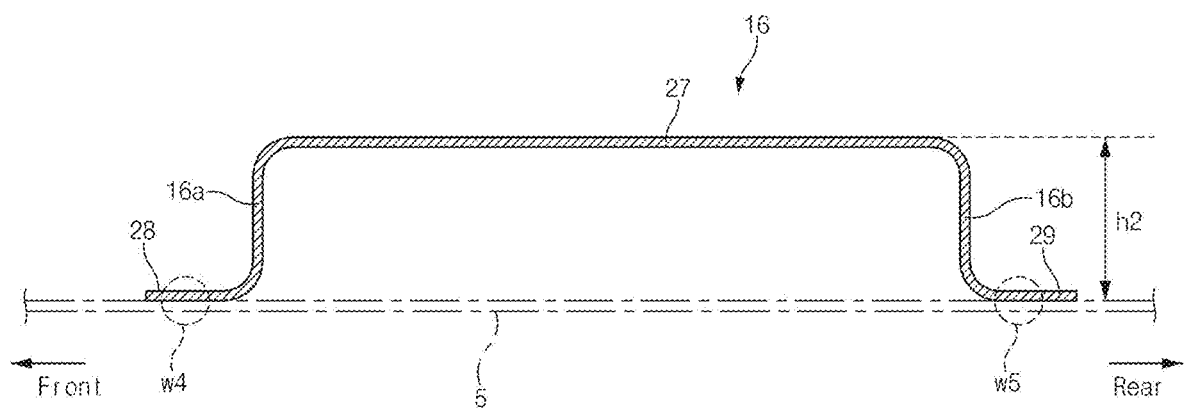
FIG. 7 illustrates a cross-sectional view, taken along line D-D of FIG. 5.

Referring to FIG. 7, the first flange 28 may be connected to the front edge of the top wall 27 through the first tapered wall 16a. The first flange 28 may extend horizontally from a bottom end of the first tapered wall 16a so that the first flange 28 may be recessed from the top wall 27 toward the floor 5. The second flange 29 may be connected to the rear edge of the top wall 27 through the second tapered wall 16b. The second flange 29 may extend horizontally from a bottom end of the second tapered wall 16b so that the second flange 29 may be recessed from the top wall 27 toward the floor 5. The first flange 28 and the second flange 29 may be joined to the floor 5 using fasteners, welding, and/or the like. The top wall 27 of the front enlarged portion 16 may have a second height h2, and the second height h2 of the top wall 27 may be the same as the first height h1 of the first and second top walls 21 and 22 of the front cross portion 11. That is, the top wall 27 of the front enlarged portion 16 may be flush with the first and second top walls 21 and 22 of the front cross portion 11.

According to an exemplary embodiment, the first flange 28 and the second flange 29 of each front enlarged portion 16 may be joined to the floor 5 by spot welding.

Referring to FIG. 7, the first flange 28 may be joined to the floor 5 through a fourth welding point w4. The plurality of fourth welding points w4 may be arranged to be spaced apart from each other at a predetermined pitch along the first flange 28 so that a fourth joint line 64 may extend along the first flange 28 of each front enlarged portion 16 as illustrated in FIG. 17.

Referring to FIG. 7, the second flange 29 may be joined to the floor 5 through a fifth welding point w5. The plurality of fifth welding points w5 may be arranged to be spaced apart from each other at a predetermined pitch along the second flange 29 so that a fifth joint line 65 may extend along the second flange 29 of each front enlarged portion 16 as illustrated in FIG. 17.

Referring to FIG. 14, each front enlarged portion 16 may include a joint wall 27a extending from the top wall 27 toward the exterior of the vehicle, and the joint wall 27a may extend in a direction inclined with respect to the top wall 27. The joint wall 27a may be joined to the side sill inner 7 using fasteners, welding, and/or the like. According to an exemplary embodiment, the joint wall 27a of the front enlarged portion 16 may be joined to the side sill inner 7 by spot welding.

Referring to FIG. 3, the recessed wall 23 of the front cross portion 11 may have a pair of side connection walls 23a connected to both ends thereof. Referring to FIG. 14, the recessed wall 23 may be connected to the top wall 27 of the corresponding front enlarged portion 16 through each side connection wall 23a.

[Rear Cross Portion]

Referring to FIG. 2, the rear cross portion 12 may be closer to the rear edge of the floor 5 than the front cross portion 11. The rear cross portion 12 may extend in the width direction of the vehicle, and the rear cross portion 12 may correspond to a rear cross member or rear seat cross member of an existing vehicle used for mounting vehicle seats.

Figure 8:
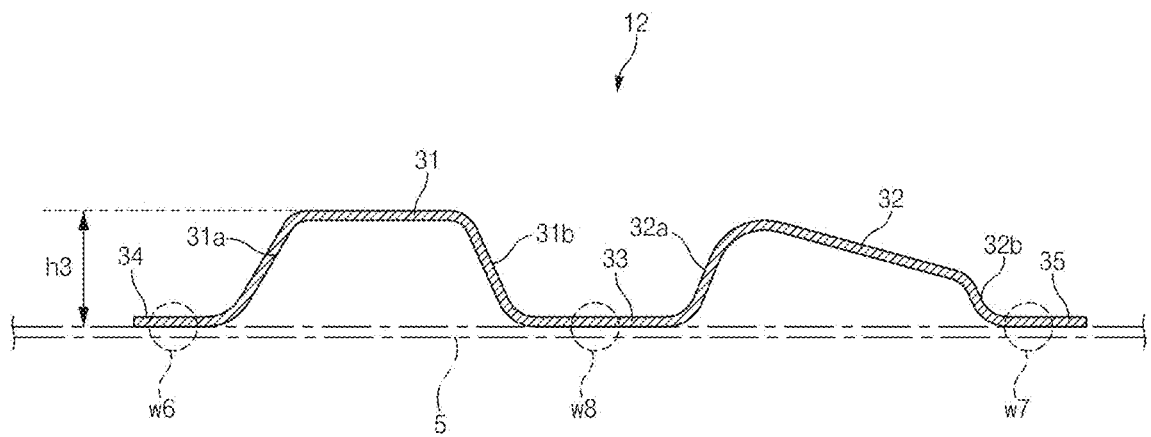
FIG. 8 illustrates a cross-sectional view, taken along line E-E of FIG. 4.

Referring to FIGS. 4 and 8, the rear cross portion 12 may include a first top wall 31, a second top wall 32 spaced apart from the first top wall 31 toward the rear of the vehicle, a recessed wall 33 located between the first top wall 31 and the second top wall 32, a first flange 34 connected to the first top wall 31, and a second flange 35 connected to the second top wall 32. The first flange 34 may extend along a front edge of the rear cross portion 12, and the second flange 35 may extend along a rear edge of the rear cross portion 12.

Referring to FIG. 3, the first top wall 31, the second top wall 32, the recessed wall 33, the front flange 34, and the second flange 35 may extend along a longitudinal axis of the rear cross portion 12. The first top wall 31, the second top wall 32, the recessed wall 33, the front flange 34, and the second flange may be parallel to each other.

Referring to FIG. 8, the first top wall 31 may extend horizontally, and a front edge of the first top wall 31 may be connected to a rear edge of the front flange 34 through a first front connection wall 31a. The first front connection wall 31a may extend obliquely from the first top wall 31 to the front flange 34. A rear edge of the first top wall 31 may be connected to a front edge of the recessed wall 33 through a front rear connection wall 31b. The front rear connection wall 31b may extend obliquely from the first top wall 31 to the recessed wall 33.

Referring to FIG. 8, the second top wall 32 may extend downwardly and obliquely toward the rear of the vehicle, and a front edge of the second top wall 32 may be connected to a rear edge of the recessed wall 33 through a second front connection wall 32a. The second front connection wall 32a may extend obliquely from the second top wall 32 to the recessed wall 33. A rear edge of the second top wall 32 may be connected to a front edge of the second flange 35 through a second rear connection wall 32b. The second rear connection wall 32b may extend obliquely from the second top wall 32 to the second flange 35.

Referring to FIG. 8, the recessed wall 33 may extend horizontally between a bottom end of the first rear connection wall 31b and a bottom end of the second front connection wall 32a so that the recessed wall 33 may be recessed from the first top wall 31 and the second top wall 32 toward the floor 5. The first flange 34 may extend horizontally from a bottom end of the first front connection wall 31a so that the first flange 34 may be recessed from the first top wall 31 toward the floor 5, and the second flange 35 may extend horizontally from a bottom end of the second rear connection wall 32b so that the second flange 35 may be recessed from the second top wall 32 toward the floor 5. The first flange 34, the second flange 35, and the recessed wall 33 may be jointed to the floor 5 using fasteners, welding, and/or the like.

According to an exemplary embodiment, the front flange 34, the second flange 35, and the recessed wall 33 of the rear cross portion 12 may be joined to the floor 5 by spot welding.

Referring to FIG. 8, the front flange 34 may be joined to the floor 5 through a sixth welding point w6. The plurality of sixth welding points w6 may be arranged to be spaced apart from each other at a predetermined pitch along the first flange 34 so that a sixth joint line 66 may extend along the first flange 34 of the rear cross portion 12 as illustrated in FIG. 17. Referring to FIG. 8, the second flange 35 may be joined to the floor 5 through a seventh welding point w7. The plurality of seventh welding points w7 may be arranged to be spaced apart from each other at a predetermined pitch along the second flange so that a seventh joint line 67 may extend along the second flange 35 of the rear cross portion 12 as illustrated in FIG. 17.

Referring to FIG. 8, the recessed wall 33 may be joined to the floor 5 through an eighth welding point w8. The plurality of eighth welding points w8 may be arranged to be spaced apart from each other at a predetermined pitch along the recessed wall 33 so that an eighth joint line 68 may extend along the recessed wall 33 as illustrated in FIG. 17.

Referring to FIG. 8, the rear cross portion 12 may have a transformed M-shaped cross section through the first top wall 31, the second top wall 32, the recessed wall 33, the front flange 34, and the second flange 35, and accordingly stiffness of the rear cross portion 12 may be improved. The first top wall 31 of the rear cross portion 12 may have a third height h3.

[Rear Enlarged Portion]

Referring to FIG. 3, the rear cross portion 12 may have a pair of rear enlarged portions 17 connected to the opposing ends thereof, respectively. Each rear enlarged portion 17 may extend from the corresponding end of the rear cross portion 12 toward the exterior of the vehicle. A central axis of the rear enlarged portion 17 may be aligned with the longitudinal axis of the rear cross portion 12.

Referring to FIG. 5, each rear enlarged portion 17 may have a pair of opposing tapered walls 17a and 17b. The pair of tapered walls 17a and 17b may include a first tapered wall 17a which is tapered toward the front of the vehicle, and a second tapered wall 17b which is tapered toward the rear of the vehicle. The first tapered wall 17a may extend from the first front connection wall 31a of the rear cross portion 12 in a direction inclined with respect to the central axis of the rear enlarged portion 17. The second tapered wall 17b may extend from the second rear connection wall 32b of the rear cross portion 12 in a direction inclined with respect to the central axis of the rear enlarged portion 17. That is, the first tapered wall 17a and the second tapered wall 17b may be inclined in opposite directions with respect to the central axis of the rear enlarged portion 17 and the longitudinal axis of the rear cross portion 12. Accordingly, a cross-sectional area of each rear enlarged portion 17 may gradually increase from the corresponding end of the rear cross portion 12 toward the exterior of the vehicle. In addition, a straight extension wall 17c may extend from the second tapered wall 17b toward the rear of the vehicle, and the straight extension wall 17c may be joined to the side sill inner 7 of the side sill 6 using fasteners, welding, and/or the like.

Referring to FIG. 5, each rear enlarged portion 17 may include a top wall 36 extending from the first top wall 31 and the second top wall 32 of the rear cross portion 12, a first flange 38 connected to a front edge of the top wall 36, and a second flange 39 connected to a rear edge of the top wall 36.

Referring to FIG. 5, the first flange 38 may extend obliquely from the front flange 34 of the rear cross portion 12, and the second flange 39 may extend obliquely from the second flange 35 of the rear cross portion 12.

Figure 9:
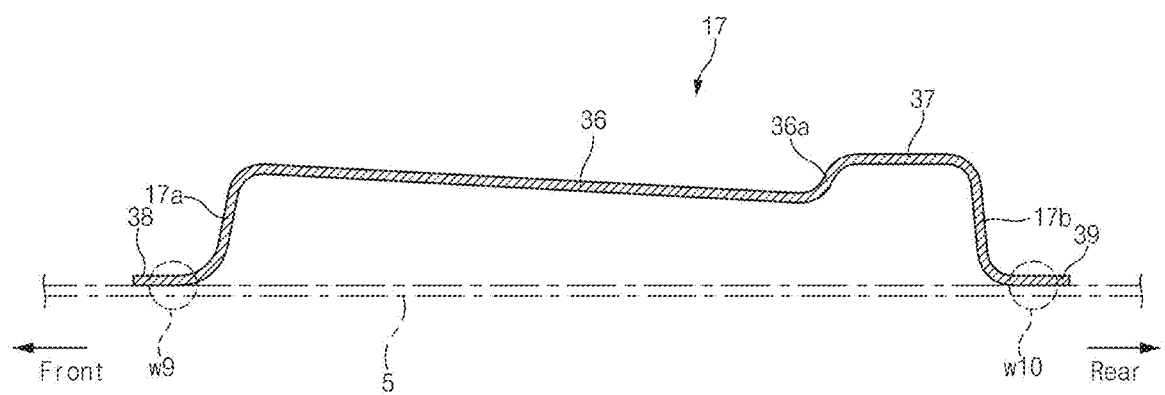
FIG. 9 illustrates a cross-sectional view, taken along line F-F of FIG. 5.

Referring to FIG. 9, the top wall 36 may extend obliquely from the front of the vehicle toward the rear of the vehicle, and a rear flat wall 37 may be connected to the rear of the top wall 36 through a rear connection wall 36a. The rear flat wall 37 may extend horizontally.

Referring to FIG. 9, the first flange 38 may be connected to the front edge of the top wall 36 through the first tapered wall 17a. The first flange 38 may extend horizontally from a bottom end of the first tapered wall 17a so that the first flange 38 may be recessed from the top wall 36 toward the floor 5. The second flange 39 may be connected to a rear edge of the rear flat wall 37 through the second tapered wall 17b. The second flange 39 may extend horizontally from a bottom end of the second tapered wall 17b so that the second flange 39 may be recessed from the top wall 36 and the rear flat wall 37 toward the floor 5. The first flange 38 and the second flange 39 may be joined to the floor 5 using fasteners, welding, and/or the like.

According to an exemplary embodiment, the first flange 38 and the second flange 39 of each rear enlarged portion 17 may be joined to the floor 5 by spot welding.

Referring to FIG. 9, the first flange 38 may be joined to the floor 5 through a ninth welding point w9. The plurality of ninth welding points w9 may be arranged to be spaced apart from each other at a predetermined pitch along the first flange 38 so that a ninth joint line 69 may extend along the first flange 38 of each rear enlarged portion 17 as illustrated in FIG. 17. The ninth joint line 69 may be continuously connected to the sixth joint line 66.

Referring to FIG. 9, the second flange 39 may be joined to the floor 5 through a tenth welding point w10. The plurality of tenth welding points w10 may be arranged to be spaced apart from each other at a predetermined pitch along the second flange 39 so that a tenth joint line 70 may extend along the second flange 39 of each rear enlarged portion 17 as illustrated in FIG. 17. The tenth joint line 70 may be continuously connected to the seventh joint line 67.

Referring to FIG. 16, each rear enlarged portion 17 may include a joint wall 36b extending from the top wall 36 toward the exterior of the vehicle, and the joint wall 36b may be connected to the top wall 36 through an outboard connection wall 36c. The joint wall 36b may extend in a direction inclined with respect to the top wall 36. The joint wall 36b may be joined to the side sill inner 7 using fasteners, welding, and/or the like. According to an exemplary embodiment, the joint wall 36b of the rear enlarged portion 17 may be joined to the side sill inner 7 by spot welding. In addition, the rear enlarged portion 17 may include an inboard flat wall 36d extending from the top wall 36 toward the interior of the vehicle, and the inboard flat wall 36d may be connected to the top wall 36 through an inboard connection wall 36e.

Referring to FIG. 3, the recessed wall 33 of the rear cross portion 12 may have a pair of side connection walls 33a connected to both ends thereof. Referring to FIG. 16, the recessed wall 33 may be connected to the top wall 36 of the corresponding rear enlarged portion 17 through each side connection wall 33a and the inboard flat wall 36d.

[Central Extension Portion]

Referring to FIG. 2, the central extension portion 13 may be configured to integrally connect the front cross portion 11 and the rear cross portion 12. In particular, a longitudinal axis of the central extension portion 13 may be perpendicular to the longitudinal axis of the front cross portion 11 and the longitudinal axis of the rear cross portion 12. The central extension portion 13 may extend along a central longitudinal axis of the floor 5 to connect the front cross portion 11 and the rear cross portion 12, and accordingly the central extension portion 13 may correspond to a central longitudinal member of an existing vehicle extending in the central longitudinal axis of the floor 5.

Figure 10:
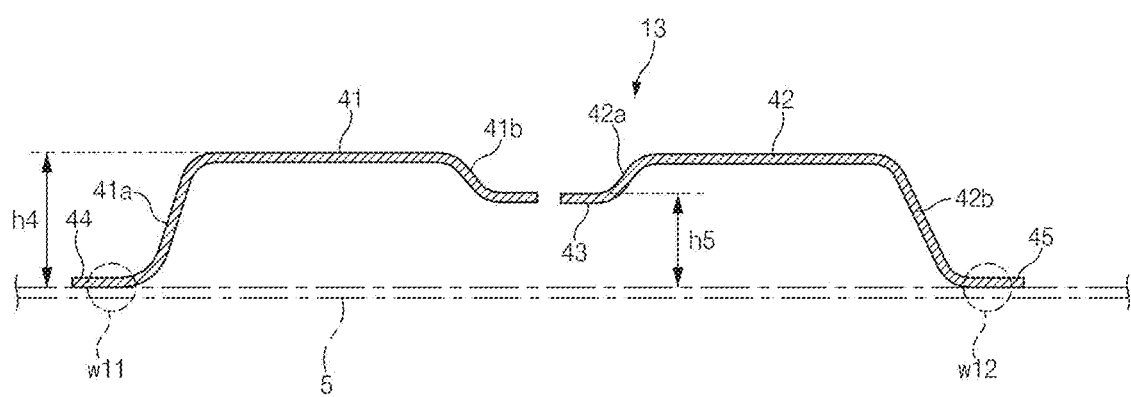
FIG. 10 illustrates a cross-sectional view, taken along line G-G of FIG. 4.

Referring to FIGS. 4 and 10, the central extension portion 13 may include a first top wall 41, a second top wall 42 spaced apart from the first top wall 41 along the width direction of the vehicle, a recessed wall 43 located between the first top wall 41 and the second top wall 42, a first flange 44 connected to the first top wall 41, and a second flange 45 connected to the second top wall 42.

Referring to FIG. 4, the first top wall 41, the second top wall 42, the recessed wall 43, the first flange 44, and the second flange 45 may extend along the longitudinal axis of the central extension portion 13, and may be parallel to each other. The recessed wall 43 may extend along the central longitudinal axis of the floor 5, and the first top wall 41 and the second top wall 42 may be located symmetrically with respect to the recessed wall 43. The first top wall 41 and the second top wall 42 may extend from the second top wall 22 of the front cross portion 11 along the longitudinal direction of the vehicle. The first top wall 41 and the second top wall 42 may extend from the second top wall 22 of the front cross portion 11 toward the rear cross portion 12, and the first flange 44 and the second flange 45 may extend from the second flange 25 of the front cross portion 11 to the front flange 34 of the rear cross portion 12.

Referring to FIG. 10, the first top wall 41 may extend horizontally, and an outer edge of the first top wall 41 may be connected to the first flange 44 through a first outer connection wall 41a. The first outer connection wall 41a may extend obliquely from the first top wall 41 to the first flange 44. An inner edge of the first top wall 41 may be connected to the recessed wall 43 through a first inner connection wall 41b. The first inner connection wall 41b may extend obliquely from the first top wall 41 to the recessed wall 43.

Referring to FIG. 10, the second top wall 42 may extend horizontally, and an inner edge of the second top wall 42 may be connected to the recessed wall 43 through a second inner connection wall 42a. The second inner connection wall 42a may extend obliquely from the second top wall 42 to the recessed wall 43. An outer edge of the second top wall 42 may be connected to the second flange 45 through a second outer connection wall 42b. The second outer connection wall 42b may extend obliquely from the second top wall 42 to the second flange 45.

Referring to FIG. 4, the first outer connection wall 41a and the second outer connection wall 42b may connect the second rear connection wall 22b of the front cross portion 11 and the first front connection wall 31a of the rear cross portion 12, and the first flange 44 and the second flange 45 may connect the second flange 25 of the front cross portion 11 and the front flange 34 of the rear cross portion 12.

Referring to FIG. 10, the recessed wall 43 may extend horizontally between a bottom end of the first inner connection wall 41b and a bottom end of the second inner connection wall 42a so that the recessed wall 43 may be recessed from the first top wall 41 and the second top wall 42 toward the floor 5. The first flange 44 may extend horizontally from a bottom end of the first outer connection wall 41a so that the first flange 44 may be recessed from the first top wall 41 toward the floor 5, and the second flange 45 may extend horizontally from a bottom end of the second outer connection wall 42b so that the second flange 45 may be recessed from the second top wall 42 toward the floor 5. A depth of the recessed wall 43 may be less than a depth of the first flange 44 and a depth of the second flange 45. The first flange 44 and the second flange 45 may be jointed to the floor 5 using fasteners, welding, and/or the like.

According to an exemplary embodiment, the first flange 44 and the second flange 45 of the central extension portion 13 may be joined to the floor 5 by spot welding.

Referring to FIG. 10, the first flange 44 may be joined to the floor 5 through an eleventh welding point w11. The plurality of eleventh welding points w11 may be arranged to be spaced apart from each other at a predetermined pitch along the first flange 44 so that an eleventh joint line 71 may extend along the first flange 44 of the central extension portion 13 as illustrated in FIG. 17.

Referring to FIG. 10, the second flange 45 may be joined to the floor 5 through a twelfth welding point w12. The plurality of twelfth welding points w12 may be arranged to be spaced apart from each other at a predetermined pitch along the second flange so that a twelfth joint line 72 may extend along the second flange 45 of the central extension portion 13 as illustrated in FIG. 17.

Referring to FIG. 10, the central extension portion 13 may have an M-shaped cross section through the first top wall 41, the second top wall 42, the recessed wall 43, the first flange 44, and the second flange 45, and accordingly stiffness of the central extension portion 13 may be improved. The first top wall 41 and the second top wall 42 of the central extension portion 13 may have a fourth height h4. The fourth height h4 of the first and second top walls 41 and 42 of the central extension portion 13 may be the same as the first height h1 of the first and second top walls 21 and 22 of the front cross portion 11. That is, the first and second top walls 21 and 22 of the front cross portion 11 may be flush with the first and second top walls 41 and 42 of the central extension portion 13. The recessed wall 43 of the central extension portion 13 may have a fifth height h5. The fifth height h5 of the recessed wall 43 may be the same as the third height h3 of the first top wall 31 of the rear cross portion 12. That is, the recessed wall 43 of the central extension portion 13 may be flush with the first top wall 31 of the rear cross portion 12.

[Side Extension Portion]

Referring to FIGS. 2 and 3, the unitary structural component 10 according to an exemplary embodiment of the present disclosure may further include a pair of side extension portions 14 located symmetrically with respect to the central extension portion 13. Each side extension portion 14 may be configured to integrally connect the front cross portion 11 and the rear cross portion 12. In particular, a longitudinal axis of the side extension portion 14 may be perpendicular to the longitudinal axis of the front cross portion 11 and the longitudinal axis of the rear cross portion 12. The longitudinal axis of the side extension portion 14 may be parallel to the longitudinal axis of the central extension portion 13.

According to an exemplary embodiment, the pair of side extension portions 14 together with the front cross portion 11, the rear cross portion 12, the central extension portion 13, and the pair of edge extension portions 18 may form a unitary one-piece structure by hot stamping, hot forming, press hardening, and/or the like. That is, the front cross portion 11, the rear cross portion 12, the central extension portion 13, the pair of edge extension portions 18, and the pair of side extension portions 14 may be made of the same material.

Figure 11:
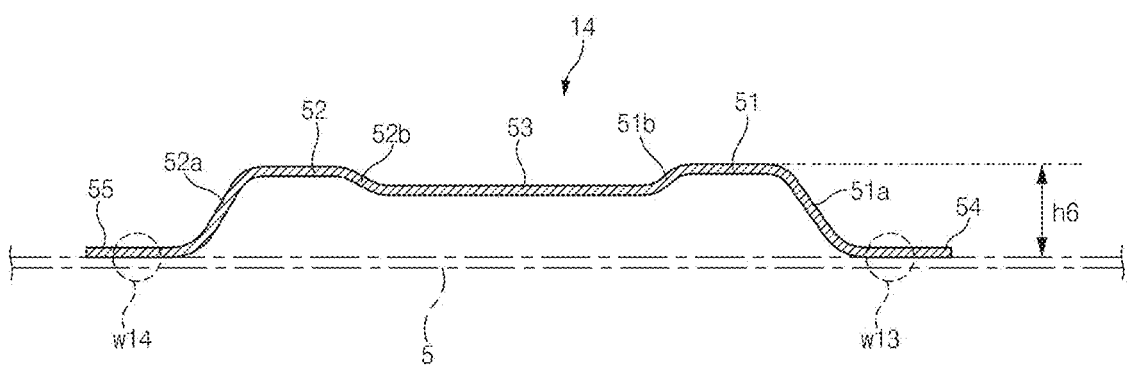
FIG. 11 illustrates a cross-sectional view, taken along line H-H of FIG. 5.

Referring to FIGS. 5 and 11, each side extension portion 14 may include a first top wall 51, a second top wall 52 spaced apart from the first top wall 51 along the width direction of the vehicle, a recessed wall 53 located between the first top wall 51 and the second top wall 52, a first flange 54 connected to the first top wall 51, and a second flange 55 connected to the second top wall 52. Referring to FIG. 17, the first flange 54 may face the corresponding flanges 44 and 45 of the central extension portion 13. Specifically, the first flange 54 of the left side extension portion 14 may face the first flange 44 of the central extension portion 13, and the first flange 54 of the right side extension portion 14 may face the second flange 45 of the central extension portion 13. The second flange 55 may face the corresponding edge extension portion 18. Specifically, the second flange 55 of the left side extension portion 14 may face a bottom wall 59 of the left edge extension portion 18, and the second flange 55 of the right side extension portion 14 may face a bottom wall 59 of the right edge extension portion 18.

Referring to FIG. 5, the first top wall 51, the second top wall 52, the recessed wall 53, the first flange 54, and the second flange 55 may extend along the longitudinal direction of the side extension portion 14, and be parallel to each other. The first top wall 51 and the second top wall 52 may be located symmetrically with respect to the recessed wall 53. The first top wall 51 and the second top wall 52 may extend from the front cross portion 11 toward the rear cross portion 12. A front end of the first top wall 51 and a front end of the second top wall 52 may be connected through a front connection wall 56, and a rear end of the first top wall 51 and a rear end of the second top wall 52 may be connected through a rear connection wall 57. The first flange 54 and the second flange 55 may extend from the second flange 25 of the front cross portion 11 to the front flange 34 of the rear cross portion 12.

Referring to FIG. 5, each side extension portion 14 may include two front extension walls 14a and 14b extending from the front connection wall 56 toward the front cross portion 11, and two rear extension walls 14c and 14d extending from the rear connection wall 57 toward the rear cross portion 12.

Referring to FIG. 11, the first top wall 51 may extend horizontally, and an outer edge of the first top wall 51 may be connected to the first flange 54 through a first outer connection wall 51a. The first outer connection wall 51a may extend obliquely from the first top wall 51 to the first flange 54. An inner edge of the first top wall 51 may be connected to the recessed wall 53 through a first inner connection wall 51b. The first inner connection wall 51b may extend obliquely from the first top wall 51 to the recessed wall 53.

Referring to FIG. 11, the second top wall 52 may extend horizontally, and an outer edge of the second top wall 52 may be connected to the second flange 55 through a second outer connection wall 52a. The second outer connection wall 52a may extend obliquely from the second top wall 52 to the second flange An inner edge of the second top wall 52 may be connected to the recessed wall 53 through a second inner connection wall 52b. The second inner connection wall 52b may extend obliquely from the second top wall 52 to the recessed wall 53.

Referring to FIG. 5, the first outer connection wall 51a and the second outer connection wall 52a may connect the second rear connection wall 22b of the front cross portion 11 and the first front connection wall 31a of the rear cross portion 12, and the first flange 54 and the second flange 55 may connect the second flange 25 of the front cross portion 11 and the front flange 34 of the rear cross portion 12.

Referring to FIG. 11, the recessed wall 53 may extend horizontally between a bottom end of the first inner connection wall 51b and a bottom end of the second inner connection wall 52b so that the recessed wall 53 may be recessed from the first top wall 51 and the second top wall 52 toward the floor 5. The first flange 54 may extend horizontally from a bottom end of the first outer connection wall 51a so that the first flange 54 may be recessed from the first top wall 51 toward the floor 5, and the second flange 55 may extend horizontally from a bottom end of the second outer connection wall 52a so that the second flange 55 may be recessed from the second top wall 52 toward the floor 5. A depth of the recessed wall 53 may be less than a depth of the first flange 54 and a depth of the second flange 55. The first flange 54 and the second flange 55 may be jointed to the floor 5 using fasteners, welding, and/or the like.

According to an exemplary embodiment, the first flange 54 and the second flange 55 of each side extension portion 14 may be joined to the floor 5 by spot welding.

Referring to FIG. 11, the first flange 54 may be joined to the floor 5 through a thirteenth welding point w13. The plurality of thirteenth welding points w13 may be arranged to be spaced apart from each other at a predetermined pitch along the first flange 54 so that a thirteenth joint line 73 may extend along the first flange 54 of each side extension portion 14 as illustrated in FIG. 17.

Referring to FIG. 11, the second flange 55 may be joined to the floor 5 through a fourteenth welding point w14. The plurality of fourteenth welding points w14 may be arranged to be spaced apart from each other at a predetermined pitch along the second flange 55 so that a fourteenth joint line 74 may extend along the second flange 55 of each side extension portion 14 as illustrated in FIG. 17.

Referring to FIG. 11, each side extension portion 14 may have an M-shaped cross section through the first top wall 51, the second top wall 52, the recessed wall 53, the first flange 54, and the second flange 55. A height of the side extension portion 14 may be less than a height of the front cross portion 11. Specifically, the first top wall 51 and the second top wall 52 of the side extension portion 14 may have a sixth height h6. The sixth height h6 of the first and second top walls 51 and 52 of the side extension portion 14 may be less than the first height 1 of the first and second top walls 21 and 22 of the front cross portion 11, the third height h3 of the first top wall 31 of the rear cross portion 12, and the fourth height h4 of the first and second top walls 41 and 42 of the central extension portion 13.

The front cross portion 11 and the rear cross portion 12 may absorb impact energy in the event of a side collision/impact, and the central extension portion 13 and the pair of side extension portions 14 may improve vehicle body stiffness and noise, vibration and harshness (NVH) performance.

[Edge Extension Portion]

Referring to FIGS. 2 and 3, the pair of edge extension portions 18 may be located symmetrically with respect to the central extension portion 13 and the pair of side extension portions 14. Each edge extension portion 18 may be configured to integrally connect the corresponding end portion of the front cross portion 11 and the corresponding end portion of the rear cross portion 12.

Referring to FIG. 5, each edge extension portion 18 may extend in the longitudinal direction of the vehicle to integrally connect the corresponding front enlarged portion 16 and the corresponding rear enlarged portion 17. The edge extension portion 18 may include a top wall 58 connecting the joint wall 27a of the front enlarged portion 16 and the joint wall 36b of the rear enlarged portion 17, the bottom wall 59 connecting the second flange 29 of the front enlarged portion 16 and the first flange 38 of the rear enlarged portion 17, and a connection wall 58a connecting the second tapered wall 16b of the front enlarged portion 16 and the first tapered wall 17a of the rear enlarged portion 17. The top wall 58 may extend from the joint wall 27a of the front enlarged portion 16 to the joint wall 36b of the rear enlarged portion 17, and the bottom wall 59 may extend from the second flange 29 of the front enlarged portion 16 to the first flange 38 of the rear enlarged portion 17. The connection wall 58a may extend from the second tapered wall 16b of the front enlarged portion 16 to the first tapered wall 17a of the rear enlarged portion 17. The connection wall 58a may connect the top wall 58 and the bottom wall 59. The top wall 58, the connection wall 58a, and the bottom wall 59 of each edge extension portion 18 may be joined to the flange 5a of the floor 5 and the side sill inner 7 using fasteners, welding, and/or the like.

According to an exemplary embodiment, the bottom wall 59 and the connection wall 58a of the edge extension portion 18 may be joined to the flange 5a of the floor 5 by spot welding, and the top wall 58 of the edge extension portion 18 may be joined to the top wall 7b of the side sill inner 7 by spot welding.

Figure 12:
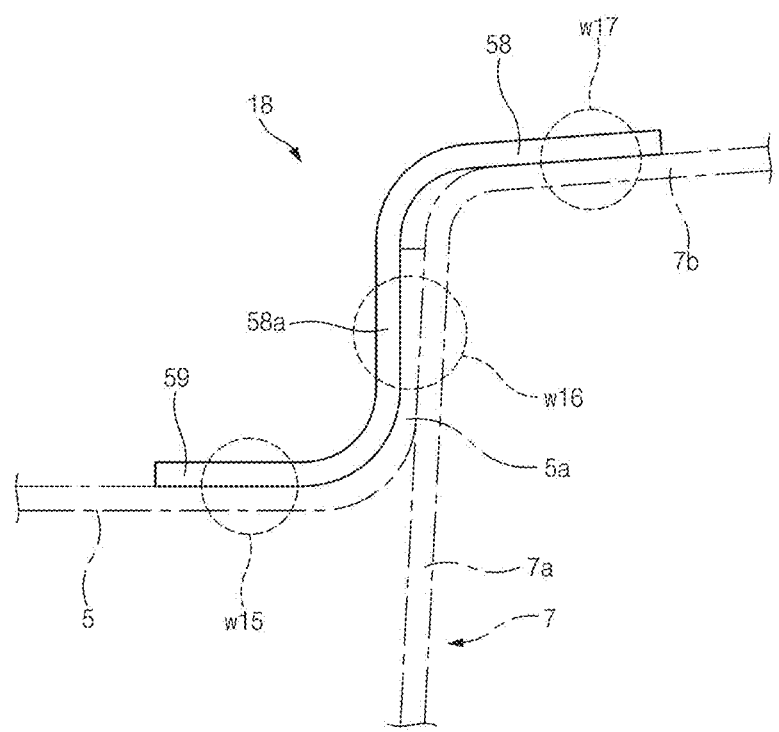
FIG. 12 illustrates a cross-sectional view, taken along line I-I of FIG. 5.

Referring to FIG. 12, the bottom wall 59 of each edge extension portion 18 may be joined to the floor 5 through a fifteenth welding point w15. The plurality of fifteenth welding points w15 may be arranged to be spaced apart from each other at a predetermined pitch along the bottom wall 59 so that a fifteenth joint line 75 may extend along the bottom wall 59 of each edge extension portion 18 as illustrated in FIG. 17.

Referring to FIG. 12, the connection wall 58a of each edge extension portion 18 may be joined to the flange 5a of the floor 5 through a sixteenth welding point w16. The plurality of sixteenth welding points w16 may be arranged to be spaced apart from each other at a predetermined pitch along the connection wall 58a so that a sixteenth joint line 76 may extend along the connection wall 58a of each edge extension portion 18 as illustrated in FIG. 17.

Referring to FIG. 12, the top wall 58 of each edge extension portion 18 may be joined to the top wall 7b of the side sill inner 7 through a seventeenth welding point w17. The plurality of seventeenth welding points w17 may be arranged to be spaced apart from each other at a predetermined pitch along the top wall 58 so that a seventeenth joint line 77 may extend along the top wall 58 of each edge extension portion 18 as illustrated in FIG. 17.

Each edge extension portion 18 may connect the corresponding front enlarged portion 16 and the corresponding rear enlarged portion 17 in the longitudinal direction of the vehicle so that the front enlarged portion 16, the edge extension portion 18, and the rear enlarged portion 17 may extend straightly. Accordingly, side stiffness of the unitary structural component may be significantly improved. The joint wall 27a of the front enlarged portion 16, the top wall 58 of the edge extension portion 18, and the joint wall 36b of the rear enlarged portion 17 may be joined to the top wall 7b of the side sill inner 7 using fasteners, welding, and/or the like so that joint stiffness between the unitary structural component 10 and the side sill inner 7 may be improved. In the event of a side collision/impact of the vehicle, the bending, rotation, and/or the like of the side sill inner 7 may be prevented, and thus the passenger compartment and a battery may be stably protected.

According to an exemplary embodiment, the front cross portion 11, the rear cross portion 12, the central extension portion 13, the side extension portion 14, the front enlarged portion 16, the rear enlarged portion 17, and the edge extension portion 18 may be made of the same material and have the same thickness, and accordingly the unitary structural component 10 may be precisely formed by hot stamping, hot forming, press hardening, and/or the like.

[Mounting of Unitary Structural Component]

Referring to FIG. 2, two front inner seat brackets 2a may be individually mounted on the front cross portion 11 using fasteners, welding, and/or the like, and two front outer seat brackets 3a may be individually mounted on the pair of front enlarged portions 16 using fasteners, welding, and/or the like. Front seats (not shown) may be mounted on the front cross portion 11 through the front inner seat brackets 2a and the front outer seat brackets 3a. Two rear inner seat brackets 2b may be individually mounted on the rear cross portion 12 using fasteners, welding, and/or the like, and two rear outer seat brackets 3b may be individually mounted on the pair of rear enlarged portions 17 using fasteners, welding, and/or the like. Rear seats (not shown) may be mounted on the rear cross portion 12 through the rear inner seat brackets 2b and the rear outer seat brackets 3b.

Figure 13:
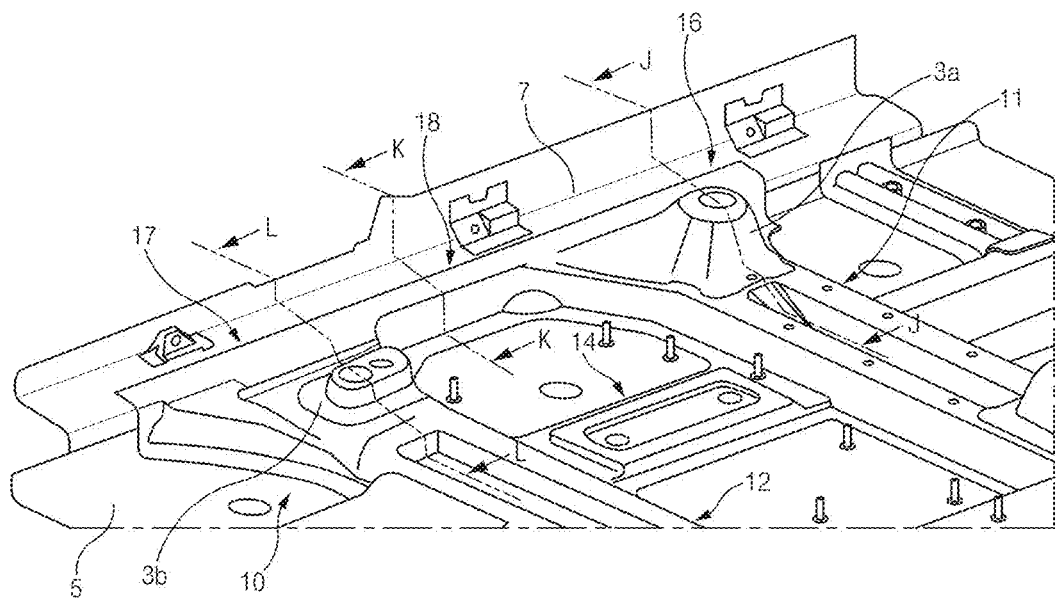
FIG. 13 illustrates a perspective view of a portion of a vehicle floor system according to an exemplary embodiment of the present disclosure.

Referring to FIG. 13, the unitary structural component according to an exemplary embodiment of the present disclosure may be joined to the floor 5 and the side sill inner 7 using fasteners, welding, and/or the like.

Referring to FIG. 14, the front outer seat bracket 3a may be joined to the corresponding front enlarged portion 16 using fasteners, welding, and/or the like, and the recessed wall 23 of the front cross portion 11 may be joined to the floor 5 through the plurality of third welding points w3. The plurality of third welding points w3 may be arranged to be spaced apart from each other at a predetermined pitch along the recessed wall 23 so that the third joint line 63 may extend along the recessed wall 23 as illustrated in FIG. 17. The joint wall 27a of the front enlarged portion 16 may be joined to the top wall 7b of the side sill inner 7 through an eighteenth welding point w18. The plurality of eighteenth welding points w18 may be arranged to be spaced apart from each other at a predetermined pitch along the joint wall 27a so that an eighteenth joint line 78 may extend along the joint wall 27a as illustrated in FIG. 17. The flange 5a of the floor 5 located below the front enlarged portion 16 may be joined to the inboard side wall 7a of the side sill inner 7 through a nineteenth welding point w19. The plurality of nineteenth welding points w19 may be arranged to be spaced apart from each other at a predetermined pitch along the inboard side wall 7a of the side sill inner 7 and the flange 5a of the floor 5 below the joint wall 27a of the front enlarged portion 16 so that a nineteenth joint line 79 may extend as illustrated in FIG. 17.

Referring to FIG. 14, the front enlarged portion 16, the inboard side wall 7a of the side sill inner 7, and the floor 5 may define an interior cavity, and the interior cavity may be concealed from the outside. A reinforcing memter 91 may be disposed in the interior cavity defined by the front enlarged portion 16, the inboard side wall 7a of the side sill inner 7, and the floor 5. As the reinforcing memter 91 is disposed in the interior cavity defined by the front enlarged portion 16, the side sill inner 7, and the floor 5, the reinforcing memter 91 may be prevented from being exposed to the outside, and accordingly a floor system of good exterior styling may be provided. The reinforcing memter 91 may improve stiffness of the front enlarged portion 16. Accordingly, in the event of a side collision/impact of the vehicle, the bending, rotation, and/or the like of the side sill inner 7 may be prevented, and crashworthiness may be improved.

Referring to FIG. 15, each edge extension portion 18 of the unitary structural component 10 may be joined to the corresponding side sill inner 7 and the corresponding flange 5a of the floor 5 using fasteners, welding, and/or the like. The bottom wall 59 of the edge extension portion 18 may be joined to the floor 5 through the fifteenth welding point w15. The plurality of fifteenth welding points w15 may be arranged to be spaced apart from each other at a predetermined pitch along the bottom wall 59 so that the fifteenth joint line 75 may extend along the bottom wall 59 of the edge extension portion 18 as illustrated in FIG. 17. The connection wall 58a of the edge extension portion 18 may be joined to the flange 5a of the floor 5 through the sixteenth welding point w16, and the flange 5a of the floor 5 may be joined to the inboard side wall 7a of the side sill inner 7 through the sixteenth welding point w16. That is, the connection wall 58a of the edge extension portion 18, the flange 5a of the floor 5, and the inboard side wall 7a of the side sill inner 7 may be triple-overlapped and joined through the sixteenth welding point w16. Accordingly, joint stiffness between the unitary structural component 10, the flange 5a of the floor 5, and the side sill inner 7 may be improved. The plurality of sixteenth welding points w16 may be arranged to be spaced apart from each other at a predetermined pitch along the connection wall 58a so that the sixteenth joint line 76 may extend along the connection wall 58a of the edge extension portion 18 as illustrated in FIG. 17. The top wall 58 of the edge extension portion 18 may be joined to the top wall 7b of the side sill inner 7 through the seventeenth welding point w17. The plurality of seventeenth welding points w17 may be arranged to be spaced apart from each other at a predetermined pitch along the top wall 58 so that the seventeenth joint line 77 may extend along the top wall 58 of the edge extension portion 18 as illustrated in FIG. 17.

Referring to FIG. 16, the rear outer seat bracket 3b may be joined to the corresponding rear enlarged portion 17 using fasteners, welding, and/or the like, and the recessed wall 33 of the rear cross portion 12 may be joined to the floor 5 through the plurality of eighth welding points w8. The plurality of eighth welding points w8 may be arranged to be spaced apart from each other at a predetermined pitch along the recessed wall 33 so that the eighth joint line 68 may extend along the recessed wall 33 as illustrated in FIG. 17. The joint wall 36b of the rear enlarged portion 17 may be joined to the top wall 7b of the side sill inner 7 through a twentieth welding point w20. The plurality of twentieth welding points w20 may be arranged to be spaced apart from each other at a predetermined pitch along the joint wall 36b so that a twentieth joint line 80 may extend along the joint wall 36b as illustrated in FIG. 17. The flange 5a of the floor 5 located below the rear enlarged portion 17 may be joined to the inboard side wall 7a of the side sill inner 7 through a twenty-first welding point w21. The plurality of twenty-first welding points w21 may be arranged to be spaced apart from each other at a predetermined pitch along the inboard side wall 7a of the side sill inner 7 and the flange 5a of the floor 5 below the joint wall 36b of the rear enlarged portion 17 so that a twenty-first joint line 81 may extend as illustrated in FIG. 17.

Referring to FIG. 16, the rear enlarged portion 17, the inboard side wall 7a of the side sill inner 7, and the floor 5 may define an interior cavity, and the interior cavity may be concealed from the outside. A reinforcing member 92 may be disposed in the interior cavity defined by the rear enlarged portion 17, the inboard side wall 7a of the side sill inner 7, and the floor 5. As the reinforcing member 92 is disposed in the interior cavity defined by the rear enlarged portion 17, the side sill inner 7, and the floor 5, the reinforcing member 92 may be prevented from being exposed to the outside, and accordingly a floor system of good exterior styling may be provided. The reinforcing member 92 may improve stiffness of the rear enlarged portion 17. Accordingly, in the event of a side collision/impact of the vehicle, the bending, rotation, and/or the like of the side sill inner 7 may be prevented, and crashworthiness may be improved.

Referring to FIG. 17, the first joint line 61 may extend along the first flange 24 of the front cross portion 11, and the pair of fourth joint lines 64 may extend along the first flanges 28 of the pair of front enlarged portions 16. The pair of fourth joint lines 64 may be continuously connected to the first joint line 61. The second joint line 62 may extend along the second flange 25 of the front cross portion 11, and the pair of fifth joint lines 65 may extend along the second flanges 29 of the pair of front enlarged portions 16. The pair of fifth joint lines 65 may be continuously connected to the second joint line 62. The third joint line 63 may extend along the recessed wall 23 of the front cross portion 11. Accordingly, the first flange 24, the second flange 25, and the recessed wall 23 of the front cross portion 11 may be firmly joined to the floor 5 through the first joint line 61, the second joint line 62, and the third joint line 63. The first flange 28 and the second flange 29 of each front enlarged portion 16 may be firmly joined to the floor 5 through the fourth joint line 64 and the fifth joint line 65.

Referring to FIG. 17, the sixth joint line 66 may extend along the front flange 34 of the rear cross portion 12, and the pair of ninth joint lines 69 may extend along the first flanges 38 of the pair of rear enlarged portions 17. The pair of ninth joint lines 69 may be continuously connected to the sixth joint line 66. The seventh joint line 67 may extend along the second flange 35 of the rear cross portion 12, and the pair of tenth joint lines 70 may extend along the second flanges 39 of the pair of rear enlarged portions 17. The pair of tenth joint lines 70 may be continuously connected to the seventh joint line 67. The eighth joint line 68 may extend along the recessed wall 33 of the rear cross portion 12. Accordingly, the front flange 34, the second flange 35, and the recessed wall 33 of the rear cross portion 12 may be firmly joined to the floor 5 through the sixth joint line 66, the seventh joint line 67, and the eighth joint line 68. The first flange 38 and the second flange 39 of each rear enlarged portion 17 may be firmly joined to the floor 5 through the ninth joint line 69 and the tenth joint line 70.

Referring to FIG. 17, the eleventh joint line 71 may extend along the first flange 44 of the central extension portion 13, the twelfth joint line 72 may extend along the second flange 45 of the central extension portion 13, and the thirteenth joint line 73 may extend along the first flange 54 of each side extension portion 14.

The first flange 44 of the central extension portion 13 may connect the second flange 25 of the front cross portion 11 and the front flange 34 of the rear cross portion 12 so that the eleventh joint line 71 may connect the second joint line 62 and the sixth joint line 66. The second flange 45 of the central extension portion 13 may connect the second flange 25 of the front cross portion 11 and the front flange 34 of the rear cross portion 12 so that the twelfth joint line 72 may connect the second joint line 62 and the sixth joint line 66. The first flange 54 of each side extension portion 14 may connect the second flange 25 of the front cross portion 11 and the front flange 34 of the rear cross portion 12 so that the thirteenth joint line 73 may connect the second joint line 62 and the sixth joint line 66.

According to an exemplary embodiment of the present disclosure, the unitary structural component 10 may include a flange structure of a closed loop shape provided between the front cross portion 11, the rear cross portion 12, the central extension portion 13, and each side extension portion 14. Specifically, in a left area of the unitary structural component 10 on the left side of the central extension portion 13, the second flange 25 of the front cross portion 11, the first flange 44 of the central extension portion 13, the first flange 54 of the left side extension portion 14, and the front flange 34 of the rear cross portion 12 may be connected to form a closed loop shape so that a left flange structure 25, 44, 54, and 34 having the closed loop shape may be provided. In a right area of the unitary structural component 10 on the right side of the central extension portion 13, the second flange 25 of the front cross portion 11, the second flange 45 of the central extension portion 13, the first flange 54 of the right side extension portion 14, and the front flange 34 of the rear cross portion 12 may be connected to form a closed loop shape so that a right flange structure 25, 45, 54, and 34 having the closed loop shape may be provided. That is, the unitary structural component 10 may have the two flange structures of the closed loop shape arranged symmetrically on both sides of the central extension portion 13. Accordingly, the central extension portion 13, the front cross portion 11, the rear cross portion 12, and the side extension portion 14 may be firmly joined to the floor 5.

Referring to FIG. 17, the fifteenth joint line 75 may extend along the bottom wall 59 of each edge extension portion 18, and the fourteenth joint line 74 may extend along the second flange 55 of each side extension portion 14. The bottom wall 59 of the edge extension portion 18 may connect the second flange 29 of the front enlarged portion 16 and the first flange 38 of the rear enlarged portion 17 so that the fifteenth joint line 75 may connect the fifth joint line 65 and the ninth joint line 69. The second flange 55 of the side extension portion 14 may connect the second flange 25 of the front cross portion 11 and the front flange 34 of the rear cross portion 12 so that the fourteenth joint line 74 may connect the second joint line 62 and the sixth joint line 66.

According to an exemplary embodiment of the present disclosure, the unitary structural component 10 may include a flange structure of a closed loop shape provided between the front cross portion 11, the rear cross portion 12, each side extension portion 14, and each edge extension portion 18 facing the side extension portion 14. Specifically, in a left edge area of the unitary structural component 10 on the left side of the central extension portion 13, the second flange 25 of the front cross portion 11, the second flange 29 of the front enlarged portion 16, the second flange 55 of the left side extension portion 14, the front flange 34 of the rear cross portion 12, the first flange 38 of the rear enlarged portion 17, and the bottom wall 59 of the left edge extension portion 18 may be connected to form a closed loop shape so that a left flange structure 25, 29, 55, 34, 38, and 59 having the closed loop shape may be provided. In a right edge area of the unitary structural component 10 on the right side of the central extension portion 13, the second flange 25 of the front cross portion 11, the second flange 29 of the front enlarged portion 16, the second flange 55 of the right side extension portion 14, the front flange 34 of the rear cross portion 12, the first flange 38 of the rear enlarged portion 17, and the bottom wall 59 of the right edge extension portion 18 may be connected to form a closed loop shape so that a right flange structure 25, 29, 55, 34, 38, and 59 having the closed loop shape may be provided. That is, the unitary structural component 10 may have the two flange structures of the closed loop shape arranged symmetrically on both left and right edge areas. Accordingly, the side extension portion 14, the front cross portion 11, the rear cross portion 12, and the edge extension portion 18 may be firmly joined to the floor 5.

Referring to FIG. 17, the nineteenth joint line 79 and the twenty-first joint line 81 may be aligned with the sixteenth joint line 76 in the longitudinal direction of the vehicle. Accordingly, the nineteenth joint line 79, the sixteenth joint line 76, and the twenty-first joint line 81 may be connected straightly in the longitudinal direction of the vehicle.

Referring to FIG. 17, the eighteenth joint line 78 and the twentieth joint line 80 may be aligned with the seventeenth joint line 77 in the longitudinal direction of the vehicle. Accordingly, the eighteenth joint line 78, the seventeenth joint line 77, and the twentieth joint line 80 may be connected straightly in the longitudinal direction of the vehicle.

Figure 18:
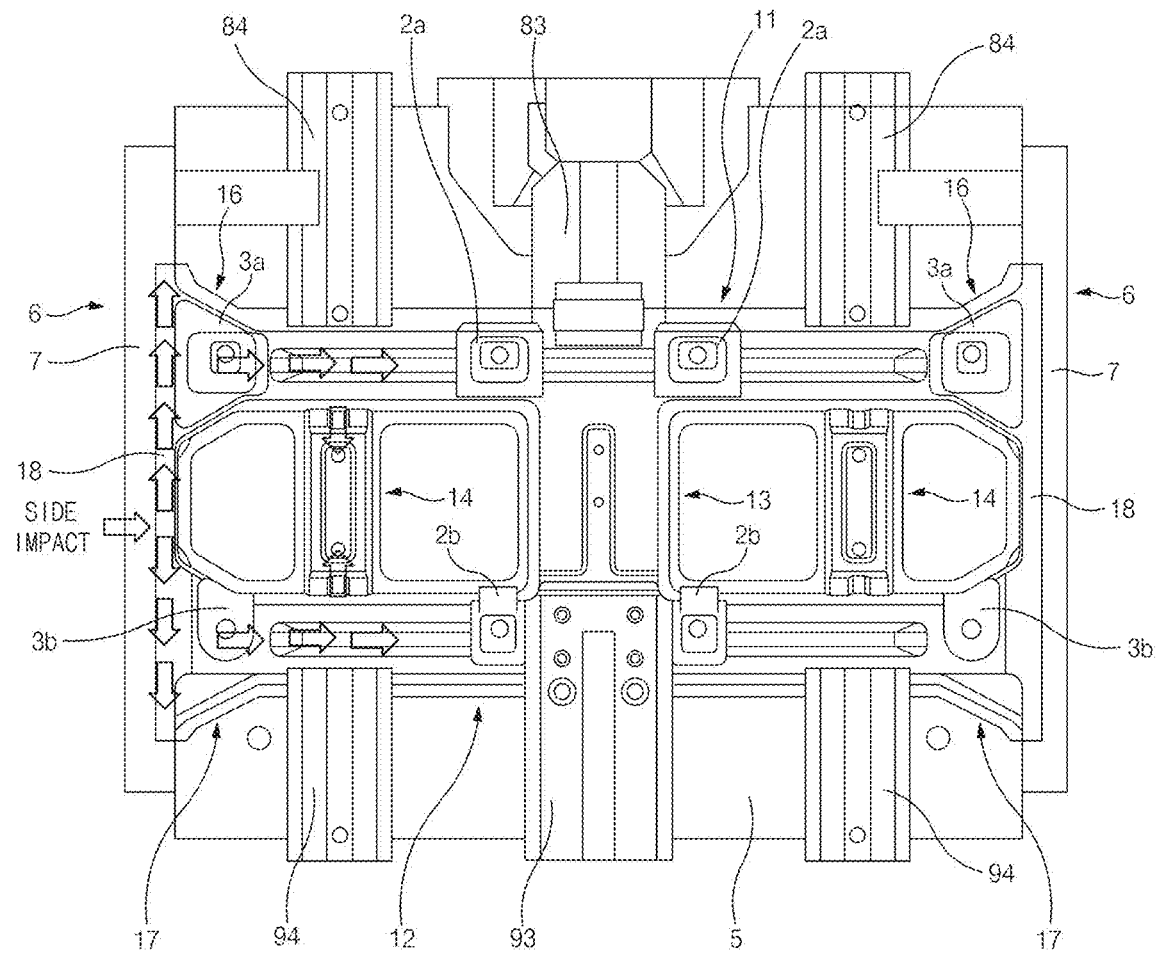
FIG. 18 illustrates a plan view of a state in which an impact load is transferred to a vehicle floor system according to an exemplary embodiment of the present disclosure in the event of a side collision/impact of the vehicle.

Referring to FIG. 18, in the event of a side collision/impact of the vehicle, an impact load may be transferred to the edge extension portion 18 of the unitary structural component 10 through the side sill inner 7 of the side sill 6, and the impact load may be distributed from the edge extension portion 18 to the front enlarged portion 16 and the rear enlarged portion 17. The front enlarged portion 16 may stably transfer the impact load to the front cross portion 11 through the pair of tapered walls 16a and 16b. Each of the tapered walls 16a and 16b of the front enlarged portion 16 may serve as a load path. The rear enlarged portion 17 may stably transfer the impact load to the rear cross portion 12 through the pair of tapered walls 17a and 17b. Each of the tapered walls 17a and 17b of the rear enlarged portion 17 may serve as a load path.

Referring to FIGS. 14, 15, and 16, the flange 5a of the floor 5 may be entirely joined to the inboard side wall 7a of the side sill inner 7 by spot welding. Accordingly, in the event of a side collision/impact of the vehicle, the rotation of the side sill inner 7 or deformation of the side sill inner 7 into the passenger compartment may be significantly reduced.

As set forth above, according to exemplary embodiments of the present disclosure, the plurality of associated components attached to the floor may form a unitary one-piece structure so that the stiffness, strength, and crashworthiness of the vehicle may be improved, and a floor system of good exterior styling may be provided. In particular, the front cross portion, the rear cross portion, the central extension portion, and the pair of edge extension portions may form a unitary one-piece structure so that the movements or deformations of the front cross portion, the rear cross portion, the central extension portion, and the pair of edge extension portions may not be independent from each other in the event of a vehicle impact/collision, and thus crashworthiness of the vehicle may be significantly improved.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A unitary structural component, comprising:
   a front cross portion;
   a rear cross portion spaced apart from the front cross portion;
   a central extension portion connecting the front cross portion and the rear cross portion; and
   a pair of edge extension portions connecting opposing ends of the front cross portion and opposing ends of the rear cross portion, respectively,
   wherein the front cross portion, the rear cross portion, the central extension portion, and the pair of edge extension portions form a unitary one-piece structure,
      wherein the front cross portion includes a pair of front enlarged portions connected to the opposing ends thereof, respectively, and
      a cross-sectional area of each front enlarged portion gradually increases from a corresponding end of the front cross portion toward an exterior of a vehicle.

2. The unitary structural component according to claim 1, wherein each front enlarged portion has a pair of opposing tapered walls, and the pair of tapered walls are inclined in opposite directions with respect to a longitudinal axis of the front cross portion.

3. The unitary structural component according to claim 1, wherein the rear cross portion includes a pair of rear enlarged portions connected to the opposing ends thereof, respectively, and
a cross-sectional area of each rear enlarged portion gradually increases from a corresponding end of the rear cross portion toward the exterior of the vehicle.

4. The unitary structural component according to claim 3, wherein each rear enlarged portion has a pair of opposing tapered walls, and
the pair of tapered walls are inclined in opposite directions with respect to a longitudinal axis of the rear cross portion.

5. The unitary structural component according to claim 1, wherein a longitudinal axis of the central extension portion is perpendicular to a longitudinal axis of the front cross portion and a longitudinal axis of the rear cross portion.

6. The unitary structural component according to claim 1, further comprising a pair of side extension portions located symmetrically with respect to the central extension portion,
wherein a longitudinal axis of each side extension portion is parallel to a longitudinal axis of the central extension portion.

7. The unitary structural component according to claim 6, wherein a height of the side extension portion is less than that of the front cross portion.

8. The unitary structural component according to claim 6, wherein the front cross portion, the rear cross portion, the central extension portion, the pair of edge extension portions, and the pair of side extension portions are made of the same material and have the same thickness.

9. The unitary structural component according to claim 1, wherein the front cross portion has a pair of front enlarged portions connected to the opposing ends thereof, respectively,
the rear cross portion has a pair of rear enlarged portions connected to the opposing ends thereof, respectively, and
each edge extension portion extends from a corresponding front enlarged portion to a corresponding rear enlarged portion.

10. A vehicle floor system, comprising:
a floor having a pair of opposing flanges;
a pair of side sill inners joined to the pair of opposing flanges, respectively; and
a unitary structural component joined to the floor,
wherein the unitary structural component includes a front cross portion, a rear cross portion spaced apart from the front cross portion, a central extension portion connecting the front cross portion and the rear cross portion, and a pair of edge extension portions connecting opposing ends of the front cross portion and opposing ends of the rear cross portion, respectively, and
the front cross portion, the rear cross portion, the central extension portion, and the pair of edge extension portions form a unitary one-piece structure,
wherein the front cross portion includes a pair of front enlarged portions connected to the opposing ends thereof, respectively, and
a cross-sectional area of each front enlarged portion gradually increases from a corresponding end of the front cross portion toward an exterior of a vehicle.

11. The vehicle floor system according to claim 10, wherein the unitary structural component further includes a pair of side extension portions located symmetrically with respect to the central extension portion,
a longitudinal axis of the central extension portion is perpendicular to a longitudinal axis of the front cross portion and a longitudinal axis of the rear cross portion, and
the longitudinal axis of the central extension portion is parallel to a longitudinal axis of the pair of side extension portions.

12. The vehicle floor system according to claim 11, further comprising a flange structure of a closed loop shape provided between the front cross portion, the rear cross portion, the central extension portion, and each side extension portion facing the central extension portion, and
wherein the flange structure of the closed loop shape is joined to the floor.

13. The vehicle floor system according to claim 10, wherein the front enlarged portion includes a joint wall joined to a corresponding side sill inner,
the front enlarged portion, the side sill inner, and the floor define an interior cavity, and
a reinforcing member is disposed in the interior cavity.

14. The vehicle floor system according to claim 10, wherein the rear cross portion includes a pair of rear enlarged portions connected to the opposing ends thereof, respectively, and
a cross-sectional area of each rear enlarged portion gradually increases from a corresponding end of the rear cross portion toward the exterior of the vehicle.

15. The vehicle floor system according to claim 14, wherein the rear enlarged portion includes a joint wall joined to a corresponding side sill inner,
the rear enlarged portion, the side sill inner, and the floor define an interior cavity, and
a reinforcing member is disposed in the interior cavity.

16. The vehicle floor system according to claim 10, wherein each edge extension portion is at least partially overlapped and joined to a corresponding side sill inner and a corresponding flange of the floor.

17. The vehicle floor system according to claim 10, wherein each flange of the floor is joined to an inboard side wall of a corresponding side sill inner.

* * * * *